United States Patent [19]
Ohno et al.

[11] Patent Number: 6,115,352
[45] Date of Patent: Sep. 5, 2000

[54] OPTICAL INFORMATION RECORDING MEDIUM CAPABLE OF REWRITING DATA AT LOW REFLECTANCE AND DETERIORATION CONDITION

[75] Inventors: Takashi Ohno; Masaaki Mizuno; Masae Kubo; Kanako Tsuboya; Michikazu Horie, all of Kanagawa, Japan

[73] Assignee: Mitsubishi Chemical Corporation, Tokyo, Japan

[21] Appl. No.: 08/873,086

[22] Filed: Jun. 11, 1997

[30] Foreign Application Priority Data

Dec. 5, 1996 [JP] Japan ................................. 8-325207

[51] Int. Cl.[7] ........................................... G11B 7/24
[52] U.S. Cl. ................. 369/275.4; 428/64.4; 430/270.13
[58] Field of Search ........................... 369/275.4, 275.1, 369/275.2, 275.5, 272, 273; 430/321, 320, 270.13; 428/64.1, 64.4

[56] References Cited

U.S. PATENT DOCUMENTS

| | | | |
|---|---|---|---|
| 5,249,175 | 9/1993 | Akahira et al. ........................ | 369/275.1 |
| 5,298,305 | 3/1994 | Shinozuka et al. ........................ | 428/64 |
| 5,410,534 | 4/1995 | Nagata et al. ........................ | 369/275.4 |
| 5,581,539 | 12/1996 | Horie et al. ............................ | 369/275.4 |
| 5,736,657 | 4/1998 | Ide et al. ................................ | 428/64.5 |
| 5,745,475 | 4/1998 | Ohno et al. ............................ | 369/275.4 |

*Primary Examiner*—Tan Dinh
*Attorney, Agent, or Firm*—Oblon, Spivak, McClelland, Maier & Neustadt, P.C.

[57] ABSTRACT

An optical information recording medium comprising a substrate provided with periodically wobbling guide grooves with a track pitch of 1.6±0.1 $\mu$m, and a lower protective layer, a phase-change type recording layer, an upper protective layer and a reflective layer formed in this sequence on the substrate, for recording, retrieving and erasing amorphous marks in the guide grooves by modulation of light intensity of at least two levels by means of a focused light having a wavelength of 780±30 nm applied from the side of the substrate opposite to the recording layer side so that a crystalline state with a reflectance of from 15 to 25% is an unrecorded state, and an amorphous state with a reflectance of less than 10% is a recorded state, wherein the grooves have a depth of from 25 to 45 nm and a width of from 0.4 to 0.6 $\mu$m.

24 Claims, 17 Drawing Sheets

FIGURE 12
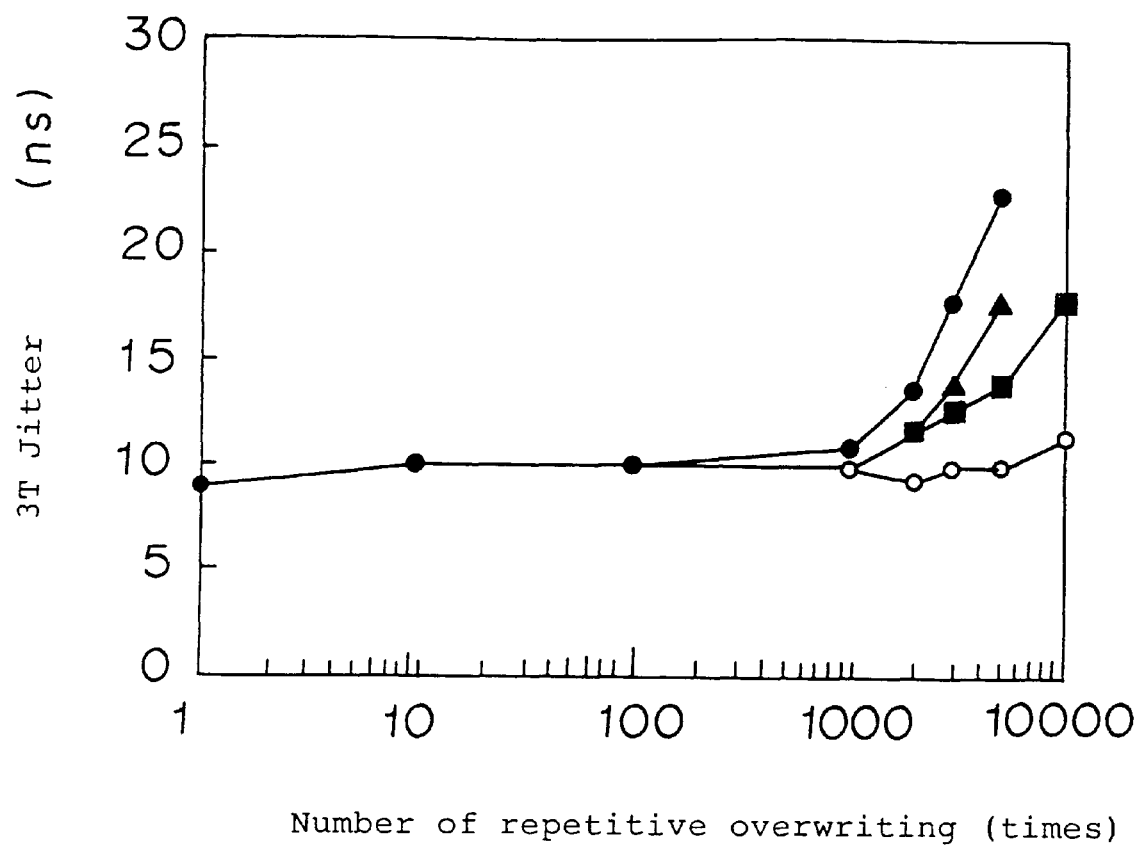
Number of repetitive overwriting (times)
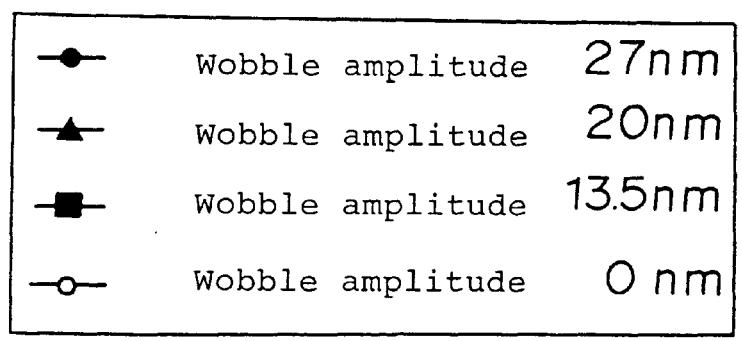

OPTICAL INFORMATION RECORDING MEDIUM CAPABLE OF REWRITING DATA AT LOW REFLECTANCE AND DETERIORATION CONDITION

BACKGROUND OF THE INVENTION

1. Field of the Invention

The present invention relates to an optical disk capable of high density recording utilizing a rewritable phase-change medium. Particularly, it relates to a phase-change medium whereby groove signals compatible with CD (compact disk) standards, can be obtained in spite of low reflectance, and deterioration during repeated overwriting of data is little, while maintaining high contrast.

2. Discussion of the Background

Along with an increasing amount of information in recent years, a recording medium capable of recording and retrieving a large amount of data at a high density and at a high speed has been demanded, and an optical disk is expected to be just suitable for such an application.

Optical disks include a write-once type disk capable of recording only for once and a rewritable-type disk capable of recording and erasing many times.

As the rewritable-type optical disk, a magneto-optical medium utilizing a magneto-optical effect, or a phase-change medium utilizing the change in reflectance due to the reversible change in the crystal state, may be mentioned.

The phase-change medium has a merit that it is capable of recording/erasing simply by modulating the power of a laser beam without requiring an external magnetic field, and the size of a recording and retrieving device can be made small.

Further, it has a merit that a high density recording can be attained by a shorter wavelength light source without any particular alteration of the material of e.g. the recording layer from the currently predominantly employed medium capable of recording and erasing at a wavelength of about 800 nm.

As the material for the recording layer of such a phase-change medium, a thin film of a chalcogenic alloy is often used. For example, an alloy of GeSbTe type, InSbTe type, GeSnTe type or AgInSbTe type may be mentioned.

In a rewritable phase-change type recording medium which is practically employed at present, an unrecorded or erased state is a crystalline state, and recording is carried out by forming an amorphous bit. The amorphous bit is formed by heating the recording layer to a temperature higher than the melting point, followed by quenching. To prevent evaporation or deformation of the recording layer by such heat treatment, it is common to sandwich the recording layer with heat resistant and chemically stable dielectric protective layers. In the recording step, these protective layers facilitate heat dissipation from the recording layer to realize overcooled state, and thus contribute to formation of the amorphous bit.

Further, it is common that a metal reflective layer is formed on the above described sandwich structure to obtain a quadri-layer structure, whereby the heat dissipation is further facilitated so that the amorphous bit will be formed under a stabilized condition.

Erasing (crystallization) is carried out by heating the recording layer to a temperature higher than the crystallization temperature and lower than the melting point of the recording layer. In this case, the above-mentioned dielectric protective layers serve as heat accumulating layers for keeping the recording layer at a temperature sufficiently high for solid phase crystallization.

A phase-change medium which is capable of carrying out the erasing and rewriting steps solely by intensity modulation of one focused light beam, is called a 1-beam overwritable phase-change medium (Jpn. J. Appl. Phys., 26 (1987), suppl. 27-4, pp. 61–66).

With a recording system employing the 1-beam overwritable phase-change medium, the multilayer structure of the recording medium and the circuit structure of the drive can be simplified. Therefore, an attention has been drawn to this system as an inexpensive high density and large capacity recording system.

In recent years, rewritable compact disks (CD-Rewritable, CD-RW) have been proposed ("CD-ROM professional", USA, September, 1996, p. 29–44, or preparatory papers for Phase-change Optical Recording Symposium, 1995, p. 41–45).

With CD, rows of pits with length modulated by data sequence, formed on a substrate with a pitch of 1.6±0.1 $\mu$m are scanned by a focused laser beam having a wavelength of 780±30 nm from the rear side of the substrate to read out the recorded information. Here, the reflectance at a non-pitted portion is stipulated to be at least 70%.

With CD-RW, it is difficult to accomplish compatibility with CD if such a high reflectance as at least 70% is included. However, by bringing the reflectance at an unrecorded portion to a level of from 15 to 25% and the reflectance at a recorded portion to a level of less than 10%, compatibility with CD can be secured with respect to the record signals and groove signals, and by adding an amplifying system to cover the low reflectance to the retrieving system, compatibility can be secured within the range of the existing CD drive technology.

In CD-RW, grooves are used as recording tracks, and recording is carried out in the grooves, and wobbling is used for these grooves to include address information (JP-A-5-210849).

FIG. 1 shows a schematic view illustrating wobbling grooves 2 formed on the surface of a substrate 1. However, the wobble amplitude is exaggerated. The wobbling is called "wobble" and frequency-modulated (FM) by a carrier frequency of 22.05 kHz, and its amplitude (Wobble Amplitude) is very small at a level of 30 nm as compared with the pitch of grooves 2 (i.e. the distance between the imaginary center lines of grooves 2: usually about 1.6±0.1 $\mu$m).

Such a wobble frequency-modulated by absolute time information or address information, is called ATIP (Absolute Time In Pre-groove) or ADIP (Address In Pre-groove), which has already been used in a recordable compact disk (CD-Recordable, CD-R) or in a mini disk ("CD family", coauthored by Heitaro Nakajima, Takao Inohashi and Hiroshi Ogawa, Ohm-sha (1996) chapter 4 and Proceedings of the IEEE, vol. 82 (1994) p. 1490).

The recording process of the above phase-change medium involves a drastic heat cycle such that the recording layer is melted and then quenched to a temperature lower than the melting point within a few tens nano seconds. Therefore, even if the recording layer is sandwiched by dielectric protective layers, microscopic deformations and segregations will be accumulated by repetitive overwriting for a few thousands to a few tens thousands times, and will eventually lead to an increase of optically recognizable noises or formation of local defects of micron order (J. Appl. Phys., 78 (1995), pp 6980–6988).

Substantial improvements have been made by modifying the materials for the recording layer and the protective layers, or the multilayer structure. However, there is essentially an upper limit in the number of rewritable times, and it is usually smaller by at least one figure than a usual magnetic recording medium or magneto-optical recording medium.

With the above-described CD-RW, recording is carried out at a low linear velocity at a level of at most 6 times of the CD linear velocity and under such a severe condition as mark length modulation recording, and a higher level of repetitive overwriting durability is required.

Further, in the mark length modulation recording employing a phase-change medium for forming amorphous marks while an unrecorded state is a crystalline state, it is desired that the outlines of the amorphous marks are smooth and distinct. For this reason, in place of a conventional GeTe-$Sb_2Te_3$ pseudo binary alloy, a material for a recording layer having a smaller grain size, is desired.

Further, from the study by the present inventors, it has been found that the groove geometry is required to secure the compatibility of groove signals with the CD standards, rather lowers the repetitive overwriting durability of the phase-change medium. Namely, within a range of the groove geometry (depth: 20 to 100 nm, width: 0.2 to 0.8 $\mu$m) where there will be no trouble in tracking servo (a push-pull method or a 3 beam method) with a focused light having a wavelength of 780 nm±30 nm, the groove depth is required to be less than 60 nm, and the groove width is required to be within a range of from 0.3 to 0.6 $\mu$m in order to bring push-pull signals after recording to the same level as ROM standards (about 0.04 to 0.09) to secure the compatibility with CD-ROM (JP-A-8-21550, but this patent concerns nothing about the repetitive overwriting durability). This relation is a parameter determined substantially solely by the groove geometry, which does not substantially depend on the multilayer structure of the phase-change medium.

On the other hand, there is a tendency that the repetitive overwriting durability is better when the groove is deep and narrow in width. From the study by the present inventors, it has been found that the repetitive overwriting durability abruptly deteriorates when the groove depth becomes shallower than 50 nm.

Thus, to secure the compatibility with the groove signals of conventional CD, the overwriting durability has to be sacrificed to some extent, but it is desired to minimize such a sacrifice.

On the other hand, in addition to the above described restriction derived from the groove signals, a new phenomenon for deterioration has been found with a CD-RW medium employing a phase-change medium, such that wobble signals are likely to leak into recorded signals by repetitive overwriting. The wobble is essential also to CD-RW to impart address information essential to detect an unrecorded region where information is to be recorded. If it is attempted to reduce the groove width to overcome the deterioration of the overwriting durability due to reduction of the groove depth, the groove walls tend to be damaged by the heat by a recording light beam edge, whereby deterioration of the signals attributable to the wobble signals is believed to be accelerated.

Further, the groove bottom also undergoes deformation by the heat generation of the recording layer. The lower protective layer has a function of not only suppressing the temperature rise of the substrate surface by the heat insulating effect but also mechanically suppressing the deformation of the substrate. Accordingly, a $ZnS$-$SiO_2$ mixture film or the like is widely used from the viewpoint of the thermal conductivity and mechanical properties.

From the study by the present inventors, it has been found very difficult to satisfy both the productivity and the repetitive overwriting durability because of the restriction of the thickness of the lower protective layer due to the optical requirements for the compatibility with the CD standards. Due to such an additional condition required to secure the compatibility with the CD standards, the number of repetitive overwriting further decreases by at least one figure to a level of a few thousands times.

The method of rewriting information per a sector unit as in a magneto-optical disk, has not yet been established with CD-RW. However, if such a method will be practically used, it is likely that the number of rewriting to a specific sector will exceed 1,000 times, whereby the problem of deterioration due to repetitive overwriting will be more serious.

Accordingly, it has been an acute demand to improve the repetitive overwriting durability while securing the compatibility with the current CD standards as far as possible.

SUMMARY OF THE INVENTION

The present inventors have found the following solutions to the above-mentioned problems encountered in the course of developing CD-RW employing a phase-change medium, and the present invention has been accomplished on the basis of such solutions.

Namely, they have found specific groove width and groove depth whereby the compatibility of groove signals with CD can readily be obtained, and they have found a combination of a groove width, a recording layer composition and a multilayer structure, whereby adequate repetitive overwriting durability can be obtained.

Firstly, by the specific groove width, acceleration of the deterioration by repetitive overwriting due to a wobble has been reduced.

Further, they have found a recording layer composition whereby jitter can be suppressed to a low level in mark length modulation recording and which is excellent also in repetitive overwriting durability. They have also found that some recording layer composition is applicable also to media other than CD-RW.

Still further, they have found a multilayer structure whereby repetitive overwriting durability is good, uniformity of reflectance can readily be obtained, and the productivity is good.

Namely, in a first aspect, the present invention provides an optical information recording medium comprising a substrate provided with periodically wobbling guide grooves with a track pitch of 1.6±0.1 $\mu$m, and a lower protective layer, a phase-change type recording layer, an upper protective layer and a reflective layer formed in this sequence on the substrate, for recording, retrieving and erasing amorphous marks in the guide grooves by modulation of light intensity of at least two levels by means of a focused light having a wavelength of 780±30 nm applied from the side of the substrate opposite to the recording layer side so that a crystalline state with a reflectance of from 15 to 25% is an unrecorded state, and an amorphous state with a reflectance of less than 10% is a recorded state, wherein the recording layer is a thin film of an alloy of $My_y(Sb_xTe_{1-x})_{1-y}$ where $0 \leq y < 0.3$, $0.5 < x < 0.9$, and My is at least one member selected from the group consisting of In, Ga, Zn, Ge, Sn, Si, Cu, Au, Ag, Pd, Pt, V, Nb, Ta, Pb, Cr, Co, O, S and Se, and its thickness is from 15 to 30 nm, the thickness of the lower protective layer is at least 70 nm and less than 150 nm and thicker by more than 0 nm and not more than 30 nm than the thickness where the reflectance in the crystalline state becomes minimum, and the grooves have a depth of from 25 to 45 nm and a width of from 0.4 to 0.6 µm.

In a second aspect, the present invention provides an optical information recording medium comprising a substrate provided with periodically wobbling guide grooves with a track pitch of 1.6±0.1 µm, and a first lower protective layer, a second lower protective layer, a phase-change type recording layer, an upper protective layer and a reflective layer formed in this sequence on the substrate, for recording, retrieving and erasing amorphous marks in the guide grooves by modulation of light intensity of at least two levels by means of a focused light having a wavelength of 780±30 nm applied from the side of the substrate opposite to the recording layer side so that a crystalline state with a reflectance of from 15 to 25% is an unrecorded state, and an amorphous state with a reflectance of less than 10% is a recorded state, wherein the recording layer is a thin film of an alloy of $My_y(Sb_xTe_{1-x})_{1-y}$ where $0 \leq y < 0.3$, $0.5 < x < 0.9$, and My is at least one member selected from the group consisting of In, Ga, Zn, Ge, Sn, Si, Cu, Au, Ag, Pd, Pt, V, Nb, Ta, Pb, Cr, Co, O, S and Se, and its thickness is from 15 to 30 nm, the difference between the refractive index of the first lower protective layer and the refractive index of the substrate is less than 0.1, the thickness of the second lower protective layer is thinner by more than 0 nm and not more than 30 nm than the minimum thickness where the reflectance in the crystalline state becomes minimum, the total thickness of the first and second lower protective layers is at least 70 nm and less than 150 nm, and the grooves have a depth of from 25 to 45 nm and a width of from 0.4 to 0.6 µm.

In a third aspect, the present invention provides an optical information recoding medium which is a rewritable optical information recording medium comprising a substrate and a phase-change type recording layer comprising $Sb_xTe_{1-x}$, where $0.6 \leq x \leq 0.85$, as the main component, formed on the substrate, wherein a readily crystallizable crystallization accelerating layer is formed between the substrate and the recording layer in contact with the recording layer in a thickness of from 0.2 to 5 nm, and the recording layer is treated for initial crystallization by irradiation with light energy.

In the accompanying drawings:

FIG. 12 is a view illustrating the change of the overwriting characteristic due to the wobble amplitude.

DETAILED DESCRIPTION OF THE PREFERRED EMBODIMENTS

Figure 1:
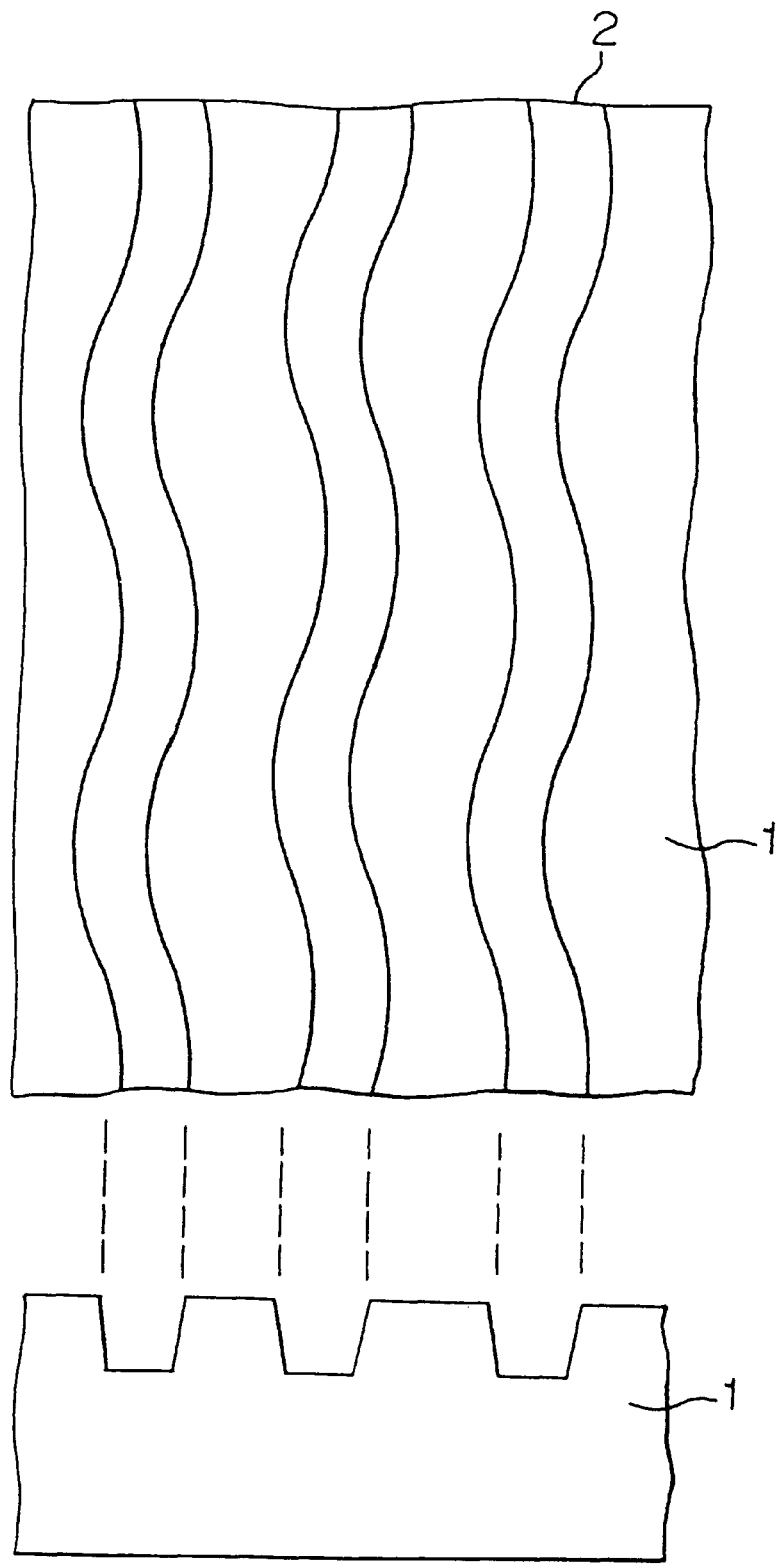
FIG. 1 is a schematic view illustrating wobbling grooves.
Figure 2:
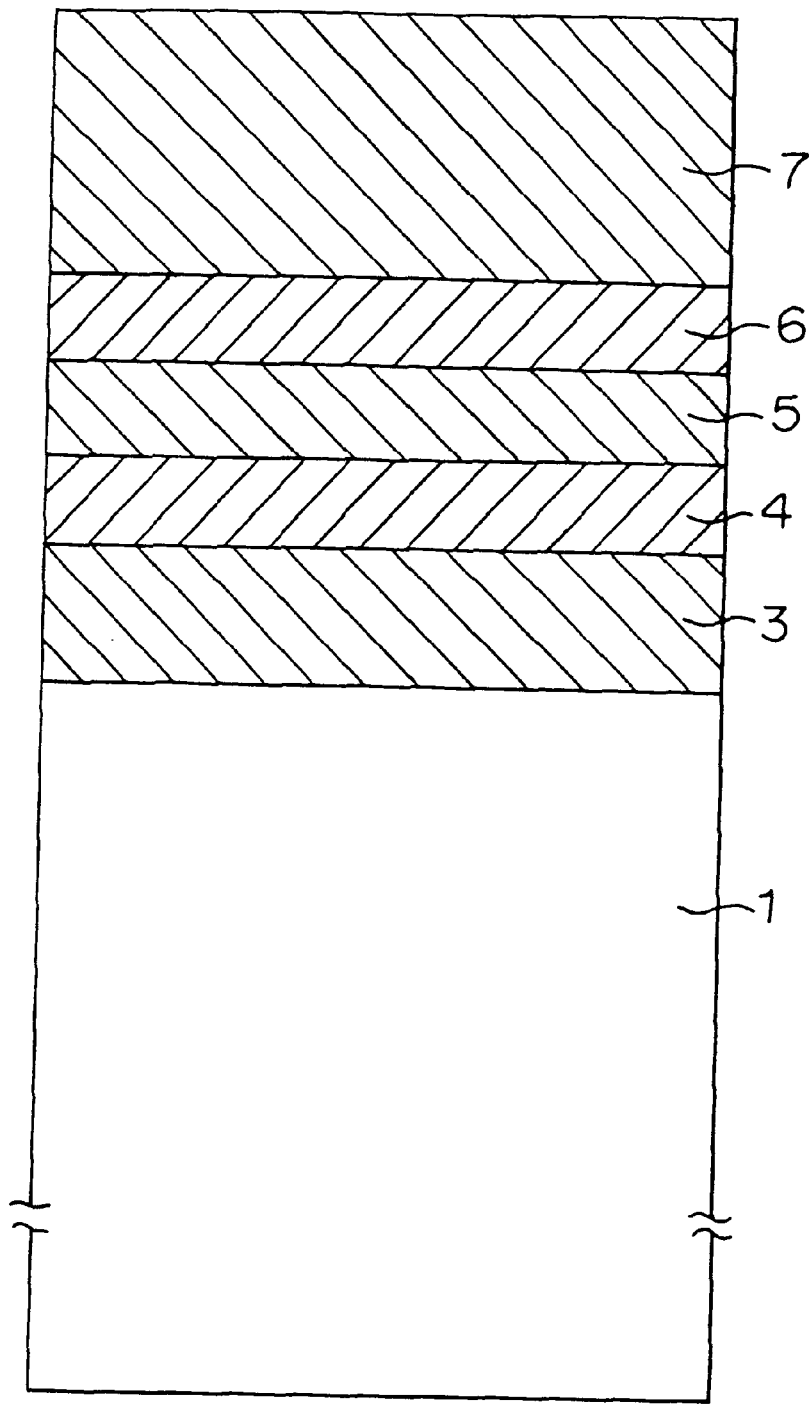
FIG. 2 is a schematic view illustrating an embodiment of the optical recording medium of the present invention.

As shown in FIG. 2, the optical information recording medium used in the present invention, has a structure of substrate 1/dielectric lower protective layer 3/recording layer 4/dielectric upper protective layer 5/reflective layer 6. It is preferred that the top is coated with an ultraviolet-curable or thermosetting resin (protective coating layer 7).

As the substrate for the medium, a transparent resin such as polycarbonate, acrylic resin or polyolefin, or glass, may be employed. Among them, a polycarbonate resin is most preferred, since it is inexpensive and has been most commonly practically used in CD.

The recording layer 4, the protective layers 3 and 5 and the reflective layer 6 are formed by e.g. a sputtering method. With a view to preventing oxidation or contamination among the respective layers, it is preferred to carry out the film formation in an in-line apparatus wherein the target for the recording layer, the targets for the protecting layers and, if necessary, the target for the reflective layer, are disposed in the same vacuum chamber.

To prevent deformation due to a high temperature during recording, the lower protective layer 3 is provided on the surface of the substrate 1, and the upper protective layer 5 is provided on the recording layer 4, usually in a thickness of from 10 to 500 nm.

If the thickness of such a protective layer made of e.g. a dielectric material, is less than 10 nm, the effect for preventing deformation of the substrate 1 or the recording layer 4 tends to be inadequate, and such a layer tends to be useless as a protective layer. If the thickness exceeds 500 nm, the internal stress of the dielectric material itself or the difference in the elastic property from the substrate 1 tends to be distinctive, whereby cracking is likely to occur.

The materials for the upper and lower protective layers are determined taking into consideration the refractive indices, the thermal conductivities, the chemical stability, the mechanical strength, the adhesion, etc. In general, an oxide, sulfide or nitride of e.g. Mg, Ca, Sr, Y, La, Ce, Ho, Er, Yb, Ti, Zr, Hf, V, Nb, Ta, Zn, Al, Si, Ge or Pb, or a fluoride of Ca, Mg or Li having high transparency and high melting point, can be used. These oxides, sulfides, nitrides and fluorides may not necessarily take stoichiometrical compositions. It is effective to control the compositions to adjust the refractive indices or the like, or to use them in admixture. From the viewpoint of the repetitive recording characteristic, a dielectric mixture is preferred. More specifically a mixture of ZnS or a rare earth sulfide with a heat resistant compound such as an oxide, nitride or carbonate, may be mentioned.

A particularly preferred structure may, for example, be such that the portion of the lower protective layer in a thickness of from 1 to 10 nm on the side which is in contact with the recording layer, is made of a mixture comprising a chalcogen compound and a heat resistant compound having a decomposition temperature or melting point of at least 1,000° C., which is not a chalcogen compound, and the remaining portion is made of a heat resistant compound of the type which is the same or different from the above heat resistant compound.

The chalcogen compound may, for example, be, in addition to ZnS and ZnSe, a sulfide of a Group IIa element such as MgS, CaS, SrS or BaS, a sulfide of a rare earth, such as $La_2S_3$ or $Ce_2S_3$, a selenium compound of a Group IIa element such as MgSe, CaSe, SrSe or BaSe, or a selenium compound of a rare earth such as $La_2Se_3$ or $Ce_2Se_3$. Further, a sulfide or a selenium compound of Ta or Nb may also be used.

The above sulfides or selenium compounds contain chalcogen elements and thus have good adhesion with chalcogen elements mainly contained in the phase-change type recording layer and with the surrounding elements. Thus, a substantial improvement in the repetitive recording characteristic is observed as compared with a case where a dielectric layer made merely of an oxide is employed.

The heat resistant compound other than the chalcogen compound, may, for example, be an oxide of Al, Si, Ge, Y, Zr, Ba, Ta, Nb, V, W, Hf, Sc or a lanthanoid, a nitride of Al, Si, Ge, Ta or B, a fluoride of Mg, Ca, Nd, Tb or La or a carbide of Si or B.

When a fluoride is used among them, it is preferred to use an oxide in combination, so that the brittleness may be overcome.

From the viewpoint of the costs and efficiency for the production of targets, it is preferred to employ silicon dioxide, yttrium oxide, barium oxide, tantalum oxide, $LaF_3$, $NdF_3$, $TbF_3$, SiC, $Si_3N_4$ or AlN.

The total amount of the above chalcogen compound and the heat resistant compound other than a chalcogen compound in the protective layer, is preferably at least 50 mol %, more preferably at least 80 mol %. If their content is less than 50 mol %, the effect for preventing deformation of the substrate or the recording layer tends to be inadequate, and the layer tends to be useless as a protective layer.

The content of the chalcogen compound is preferably from 10 to 95 mol % of the entire protective layer. If the content is less than 10 mol %, the desired property tends to be hardly obtainable. On the other hand, if it exceeds 95 mol %, the optical absorption coefficient tends to be large, such being undesirable. The content is more preferably from 15 to 90 mol %.

The content of the above heat resistant compound is preferably from 5 to 90 mol % in the entire protective layer, more preferably at least 10 mol %. If the content is outside this range, the desired property may not sometimes be obtained.

The heat resistant compound is required to have a heat resistance of at least 1,000° C., and at the same time, required to be optically adequately transparent to the laser beam to be used for recording and retrieving. Namely, in a thickness of 50 nm, the imaginary part of the complex refractive index in a wavelength region of at least about 600 nm is desired to be at most 0.1.

To obtain such optical transparency, it is preferred to use a gas mixture of Ar with oxygen and/or nitrogen during the sputtering for forming the film.

S or Se in a sulfide or a selenium compound has a high vapor pressure, and a part thereof tends to evaporate or undergo decomposition during the sputtering. If such deficiency of S or Se in a protective layer becomes substantial, the optical absorptivity tends to be defective, and the protective layer tends to be chemically unstable. Addition of oxygen or nitrogen to the sputtering gas as mentioned above, is intended to replace such deficiency with oxygen or nitrogen. Here, an oxide or nitride of the metal element of the above chalcogen compound will be formed partially in the film, but such an oxide or nitride serves as a part of the heat resistant compound, whereby the properties of the film will not be impaired.

The film density of these protective layers is preferably at least 80% of the bulk density from the viewpoint of mechanical strength (Thin Solid Films, vol., 278, (1996), p. 74–81).

As the bulk density of a thin film of a dielectric mixture, a theoretical density of the following formula is employed, wherein mi is the molar concentration of each component i, and $\sigma_i$ is the bulk density of the component alone:

$$\sigma = \Sigma m_i \sigma_i \tag{1}$$

The recording layer of the medium of the present invention is a phase-change type recording layer, and its thickness is usually preferably within a range of from 10 to 100 nm. If the thickness of the recording layer is thinner than 10 nm, no adequate contrast tends to be obtained, and the crystallization speed tends to be slow, whereby it tends to be difficult to erase the recorded information in a short time. On the other hand, if it exceeds 100 nm, an optical contrast tends to be hardly obtainable, and cracking is likely to occur, such being undesirable. Further, in order to obtain a contrast sufficient for the compatibility with CD, the thickness of the recording layer is limited within a range of from 15 to 30 nm. If the thickness is less than 15 nm, the reflectance tends to be too low, and if it exceeds 30 nm, the heat capacity tends to be large, whereby the recording sensitivity tends to be poor.

In a case where mark length recording is applied as in the case of CD-RW, it is preferred to use a thin film of an alloy comprising, as the main component, a SbTe alloy close to the $Sb_{70}Te_{30}$ eutectic point, for the recording layer, from the viewpoint of the after-mentioned optical properties and crystallizability.

Heretofore, an alloy material close to a eutectic composition has been believed to be unsuitable as a recording layer for a rewritable optical recording medium, since it undergoes phase separation during crystallization although its amorphous forming ability is high, and it can not be crystallized by heating in such a short period of time as less than 100 nano seconds (Appl. Phys. Lett., vol., 49 (1986), p. 502).

Particularly, when an attention is drawn to a GeSbTe ternary alloy, no practical crystallization speed has been obtained in the vicinity of the $Te_{85}Ge_{15}$ eutectic composition.

On the other hand, U.S. Pat. No. 5,015,548 discloses that the in the vicinity of the $Sb_{70}Te_{30}$ eutectic composition, a $Sb_xTe_{1-x}$ (0.58<x<0.75) binary alloy is useful for repeated recording and erasing between the crystalline and amorphous states, although the method is quite primitive wherein only the change in reflectance is monitored. As the prior art disclosing a composition having a third element, particularly Ge, added to $Sb_{70}Te_{30}$, JP-A-1-115685, JP-A-1-251342, JP-A-1-303643 and JP-A-4-28587 may, for example, be mentioned.

However, with respect to phase-change media in the vicinity of the SbTe eutectic composition, there has been no practical progress since then. Especially, there has been a serious problem that the initialization operation to crystallize the recording layer after film formation, is difficult, and the productivity is too low for practical application.

Accordingly, it has been considered that only a material close to the composition of a readily initializable intermetallic compound or its pseudo binary alloy exhibits practical properties (JP-A-2-243388, JP-A-2-243389, JP-A-2-243390, JP-A-2-255378, JP-A-63-228433, JP-A-61-89889, Jpn. J. Appl. Phys., vol. 69, (1991), p. 2849).

For example, with respect to a GeSbTe ternary alloy, only the composition close to a $GeTe-Sb_2Te_3$ pseudo binary alloy has attracted an attention and has been practically used in recent years. Such a trend is distinct, for example, from the proceedings (as disclosed in the abstracts from Japan Society of Applied Physics) for "Symposium on Phase-Change Recording" which was held every year since 1991.

The present inventors have paid a particular attention to a binary alloy composed of SbTe for simplification and have conducted a review of the crystallization/amorphous conversion characteristics in the vicinity of the eutectic composition from the viewpoint of applicability to mark length recording by means of an optical disk evaluating machine more suitable for high density recording, without being influenced by the conventional theories. As a result, it has been found that a recording layer comprising, as the main component, a SbTe alloy close to the $Sb_{70}Te_{30}$ eutectic composition is hardly susceptible to initial crystallization, but once it has been initially crystallized, the subsequent writing and erasing by the phase change between the amorphous and crystalline states can be carried out at an extremely high speed.

Further, evaluation has been carried out with respect to materials having various elements incorporated in the vicinity of this eutectic composition, whereby it has been found that alloys close to the SbTe eutectic composition have merits such that in repetitive overwriting employing a certain specific recording pulse pattern, deterioration is less than the well known material close to the $GeTe-Sb_2Te_3$ pseudo binary alloy, and in mark length recording, the jitter of the mark edge is low. Further, it has been found that the crystallization temperature is higher than the $Sb_7Te_{30}$ binary eutectic alloy, and the archival stability is excellent.

Specifically, as the recording layer, a thin layer of an alloy of the formula $My_y(Sb_xTe_{1-x})_{1-y}$, ($0 \leq y < 0.3$, $0.5 < x < 0.9$, and My is at least one member selected from the group consisting of In, Ga, Zn, Ge, Sn, Si, Cu, Au, Ag, Pd, Pt, V, Nb, Ta, Pb, Cr, Co, O, S and Se), is used. Among them, In, Ga, Ge, Sn, Cu. Pb, V, Nb, Ta, O, Se and S are effective to increase the crystallization temperature of the SbTe eutectic alloy and thus to improve the stability with time. Further, they are effective for fine adjustment of the optical constant (complex refractive index).

Au, Ag, Pd, Pt and Zn are effective to facilitate crystallization (initialization) of an amorphous film in the state immediately after the film formation (as-deposited state). The most important merit of employing the material for the recording layer of the present invention is that coarse grains having a reflectance different from the initialized state, scarcely form in the periphery of an amorphous mark or in the erased mark. This is a phenomenon specific to an alloy close to the eutectic point, wherein the crystal growth is controlled by the phase separation.

However, this recording layer has a characteristic such that if the crystallization speed in a solid phase is increased, the recrystallization speed during resolidification at the time of forming an amorphous mark also tends to be extremely high, whereby the periphery of the molten region tends to undergo recrystallization, whereby formation of an amorphous mark tends to be inadequate.

Namely, since this recording layer has a composition close to the eutectic point, the crystallization speed is governed by the diffusing speed of atoms for phase separation, whereby high speed erasing by crystallization can not be accomplished unless heating is carried out to a level immediately below the melting point, where the diffusing speed becomes maximum.

Namely, as compared with the currently most commonly employed recording layer close to the composition of a $GeTe-Sb_2Te_3$ pseudo binary alloy, the temperature range within which a high crystallization speed is obtainable, is narrow and shifted to a high temperature side.

Accordingly, to apply such a recording layer to an optical recording medium, it is necessary to increase the cooling rate in the vicinity of the melting point during the resolidification in order to accomplish both the high crystallization speed and formation of a sufficiently large amorphous mark.

Therefore, in the optical information recording medium of the present invention, a phenomenon has been utilized such that the recording layer material undergoes phase separation basically into a Sb phase and a $Sb_2Te_3$ phase on the line where the $Sb_{70}Te_{30}$ ratio is constant.

When annealing is conducted in an equilibrium state, the phase separation can be confirmed by X-ray diffraction. However, in an optical recording medium, if excess Sb is contained in a non-equilibrium super-cooled state where an amorphous mark is formed, fine Sb clusters will firstly precipitate during the resolidification. Such Sb clusters will remain as crystal nuclei in the amorphous mark, and it is considered that the subsequent erasing (recrystallization) of the amorphous film can be completed in a short period of time without requiring a substantial time for the phase separation (the effect of addition of excess Sb is clearly described by Okuda et al., Proc. Int. Symp. on Optical Memory, 1991, p. 73).

The recording characteristic of the medium of the present invention i.e. the reversible process of amorphous conversion and crystallization, is primarily determined by the Sb/Te ratio, that is, the excess Sb amount contained in the matrix $Sb_{70}Te_{30}$ eutectic composition. If Sb increases, sites of Sb clusters which precipitate in the super-cooled state will increase, whereby formation of crystal nuclei will be promoted. This means that even when the same crystal growing rate from the respective crystal nuclei is assumed, the time required until the space is filled with grown crystal particles will be shortened, and consequently, the time required for crystallization of the amorphous mark can be shortened. Accordingly, this is advantageous when erasing is carried out at a high linear velocity by irradiation of a laser beam in a short period of time.

On the other hand, the cooling rate of the recording layer depends also on the linear velocity during recording. Namely, even with the same multilayer structure, the cooling rate lowers as the linear velocity is low. Accordingly, as the linear velocity is low, it is preferred to employ a composition whereby the critical cooling rate for the formation of an amorphous state is small i.e. a composition in which the excess Sb amount is small.

In summary, based on the $Sb_{70}Te_{30}$ eutectic composition, the larger the excess Sb amount in the composition, the better the composition for high linear velocity.

Addition of In and Ge is particularly effective to improve the thermal stability of the amorphous state and to improve the archival stability of the amorphous recording bit.

Further, by adding Ag or Zn in addition to Ge or In, the crystallization time can be shortened in the after-mentioned initialization operation. Both of them may be used in combination.

By the addition of Ge, In, Ag or Zn, the eutectic point of matrix SbTe appears to shift from $Sb_{60}Te_{40}$ to $Sb_{65}Te_{35}$.

As described above, the linear velocity dependency as the entire My-SbTe alloy of the present invention is determined by the excess Sb amount contained in the $Sb_{70}Te_{30}$ composition as the base.

To satisfy a high linear velocity, the excess Sb amount may be increased as described above. However, if it is increased too much, the stability of the amorphous bit tends to be impaired. Therefore, with respect to the $Sb_xTe_{1-x}$ ratio, $0.60 \leq x \leq 0.85$, preferably $0.65 \leq x \leq 0.80$.

As a more specific preferred example, a recording layer having a composition of $Ag_\gamma In_\delta Sb_\epsilon Te_\eta$, wherein $3<\gamma<10$, $3<\delta<8$, $55<\epsilon<65$, $25<\eta<35$, $6<\gamma+\delta<13$, and $\gamma+\delta+\epsilon+\eta=100$, may be mentioned.

The compositional range of the recording layer of the present invention itself is partly disclosed in e.g. JP-A-4-191089, JP-A-4-232779, JP-A-6-166268, and JP-A-8-22644 (especially in JP-A-8-22644), but it is different from the ranges specifically disclosed in Examples of these publications.

From the study by the present inventors, it has been found that also with a AgInSbTe system, by defining the composition as described above, such a composition can be selectively used as a recording layer excellent in the repetitive overwriting durability and in the stability with time, for a medium for overwriting at a low linear velocity at a level of up to 6 times of the CD linear velocity.

The linear velocity dependency is determined by Sb and Te as the main components. Also with a AgInSbTe system, if Sb is contained in an amount of at least 65 atomic %, amorphous mark formation at a low linear velocity tends to be difficult, and if it is less than 55 atomic %, the crystallization speed tends to be too slow, and no adequate erasing can be accomplished.

Within this range, the larger the Sb/Te ratio, the higher the crystallization speed. However, the optimum composition is chosen taking into consideration the heat distribution determined by the multilayer structure.

Addition of In is effective to raise the crystallization temperature and thus to improve the archival stability of the amorphous recording bit. To secure the storage stability at room temperature, it is required to be at least 3 atomic %. However, if it is contained more than 8 atomic %, the phase separation is likely to take place, and segregation is likely to result by repetitive overwriting, such being undesirable.

Ag is used to facilitate initialization of the amorphous film immediately after the film formation. However, if it is added in an amount of not more than 3 atomic %, no adequate effects can be obtained. On the other hand, the addition in an amount of less than 10 atomic % is usually sufficient, although the amount may vary depending upon the method for initialization. If the amount is too much, the archival stability will be impaired.

If the total amount of the Ag and In exceeds 13 atomic %, segregation is likely to result during repetitive overwriting, such being undesirable.

As another preferred example of the recording layer, an alloy having a composition of $Mw_w Ge_z(Sb_x Te_{1-x})_{1-z-w}$, where Mw is at least one member of Ag and Zn, $0.60 \leq x \leq 0.85$, $0.01 \leq z \leq 0.20$, $0.01 \leq w \leq 0.15$, and $0.02 \leq z+w \leq 0.30$, may be mentioned.

If the Ge amount exceeds 20 atomic %, an intermetallic compound composition such as $Ge_1Sb_4Te_7$, $Ge_1Sb_2Te_4$, $Ge_2Sb_2Te_5$ or GeTe, tends to undergo significant phase separation, which in turn tends to cause the compositional change by repetitive overwriting, such being undesirable. More preferably, the amount is at most 15 atomic %. Further, if it is less than 1 atomic %, no substantial effects of the addition will be obtained.

The amount of Ag and Zn singly or in combination, is from 1 to 15 atomic %. If the amount is less than 1 atomic %, no adequate effects of the addition will be obtained, and if it exceeds 15 atomic %, the effects for stabilizing the amorphous bits by the addition of Ge tend to be lost. Further, the jitter of the recorded mark edge deteriorates probably due to precipitation of a new alloy phase, such being undesirable. Preferably, the amount is at most 10 atomic %. If the total amount of Ag or Zn and Ge is 30 atomic % or more, segregation is likely to result during repetitive overwriting, such being undesirable.

As described above, with the medium of the present invention, in the initial crystallization for crystallizing the recording layer in a solid phase at a temperature of at least the crystallization temperature, the crystallization is slow, and the productivity is not good. It is believed necessary that the recording layer composition is once subjected to phase separation from the amorphous state immediately after the film formation (as-deposited state) to form a stable crystalline state, and for this phase separation, heating in a solid phase (at a temperature of not higher than melting point) for at least one μsec., is usually required.

For example, initial crystallization of a medium using e.g. $Ge_{10}Sb_{66}Te_{24}$ as the recording layer, is attempted under such a condition that when $Ge_2Sb_2Te_5$ is employed as a recording layer, the medium in as-deposited state can be crystallized at a sufficiently high speed, substantial portions tend to remain in an amorphous state without being crystallized. If this operation is repeated a few tens times, the phase separation may be completed, and the initialization may thus be accomplished. However, such is not practical, as the productivity is low. However, once initialization has been done, subsequent crystallization (erasing) can be carried out at a high speed.

One of the reasons why the film in the as-deposited state is hardly crystallizable is believed to be such that the as-deposited amorphous state is hardly crystallizable as is different from the amorphous state of recorded marks. Further, the fact that there is no substantial crystal nuclei in the recording layer in the as-deposited state, may be a reason for the difficult crystallizability.

In fact, when a portion treated for initial crystallization is observed by an optical microscope, crystallized sections are observed in the form of separate islands with high reflectance. This is understandable if it is assumed that crystallization has proceeded only at the sections where crystal nuclei were present.

Initialization is most practically carried out usually by irradiation of a laser beam focused to a size of from a few tens to a few hundreds μm (bulk erase).

It is not practical that a time required for irradiating with a laser beam the entire surface of the disk of a CD size (120 mm in diameter) for initialization, exceeds 10 minutes. If the initial crystallization is difficult as described above, the productivity will be remarkably poor.

However, if the substrate is made of a plastic, it is not possible to carry out crystallization by raising the temperature of the entire substrate to a level of the crystallization temperature (usually at least 150° C.) of the recording layer, because the substrate is likely to be softened and deformed at such a high temperature.

The present inventors have found that as a method for carrying out the initialization in a short period of time, melt initialization is effective for the recording layer of the present invention. This is effective to remarkably increase the crystal growth rate.

During the melting, Ag, Au, Pd, Pt, Zn or the like functions as crystal nuclei.

As long as the above multilayer structure is maintained, the recording medium will not immediately be destroyed even when the recording layer is melted. For example, the recording medium will not be destroyed, if melting is limited to the center portion of a beam by local heating by means of a light beam (gas laser beam or a semiconductor laser beam) focused in e.g. an oval shape with a long axis of from 10 to 100 μm and a short axis of from 1 to 10 μm.

In addition, the melted portion is heated by remaining heat along the periphery of the beam, whereby the cooling rate tends to be slow, and good recrystallization will be carried out. The melt initialization itself is a known method. However, the present inventors have found that this method is particularly effective for the recording medium of the present invention. Namely, by this method, the time for initialization can be shortened to one tenth as compared with conventional solid phase crystallization, whereby the productivity is increased to a large extent.

Further, the melt initialization provides an effect of preventing a change in the crystallizability during erasing after overwriting.

Figure 3:
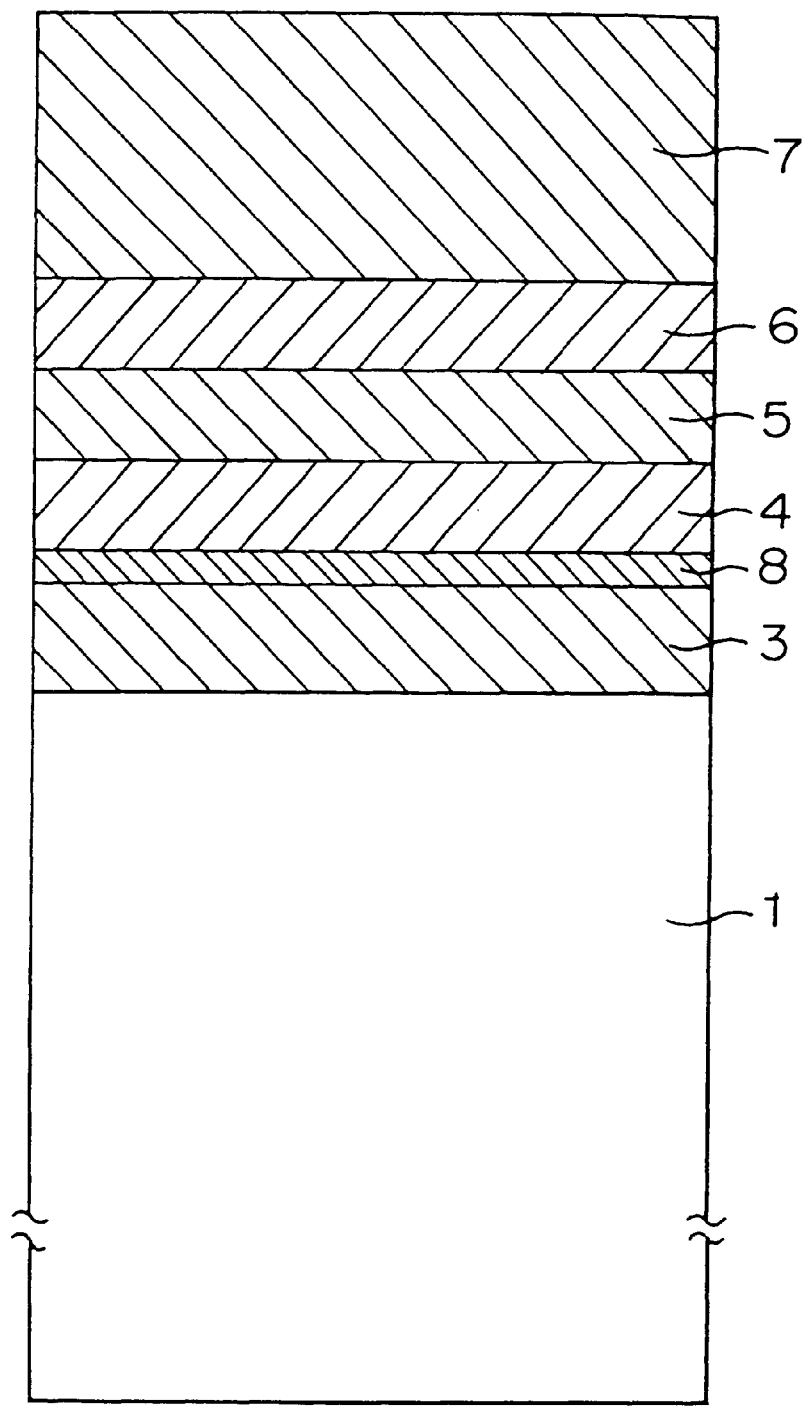
FIG. 3 is a schematic view illustrating another embodiment of the optical recording medium of the present invention.

Further, as another method for solving the difficulty in initialization of the recording layer comprising a SbTe eutectic alloy as the base, particularly the recording layer comprising a $(Sb_xTe_{1-x})$ ($0.60 \leq x \leq 0.85$) alloy as the base in the present invention, the present inventors have found it effective to provide a certain specific crystallization accelerating layer 8 on the lower protective layer side 3 in contact with the recording layer 4, as shown in FIG. 3, whereby the initial crystallization can be completed in a short period of time. As a reason for this effect, it is conceivable, for example, that the crystallization accelerating layer serves as crystal nuclei to promote the crystallization, or that the structure in the as-deposited state of the recording layer formed on the crystallization accelerating layer is different from the case where no crystallization accelerating layer is present, whereby crystallization readily proceeds.

According to the study by the present inventors, the initial crystallization can be facilitated when the crystallization accelerating layer is formed below the recording layer, but the effect tends to be small when the crystallization accelerating layer is formed on the recording layer. This indicates that the effect of the latter reason is predominant.

The crystallization accelerating layer may be made of a readily crystallizable metal such as Au, Ag, Cu or Al, but is preferably the one having a refractive index which is close to the recording layer. Therefore, for the recording layer of the composition of the present invention, the crystallization accelerating layer is preferably of a composition close to $Sb_2Te_3$.

The composition close to $Sb_2Te_3$ is, in many cases, crystalline even in the as-deposited state and likely to form crystal nuclei during the initial crystallization, and it also has a merit that it makes the as-deposited state of the recording layer formed thereon a readily crystallizable state.

The compositional range of the crystallization accelerating layer of $Sb_xTe_{1-x}$ is preferably $0.3 \leq x \leq 0.5$, more preferably $0.35 \leq x \leq 0.45$. Further, an additional element may be incorporated in an amount of at most 10 atomic %. For example, $Ge_1Sb_4Te_7$ or the like is useful for the crystallization accelerating layer.

The effect of providing the crystallization accelerating layer is particularly effective for a recording layer of $Ge_y(Sb_xTe_{1-x})_{1-y}$, where $0.60 \leq x \leq 0.85$ and $0.01 \leq y \leq 0.20$, which contains no crystallization accelerating additional element.

After recording an amorphous mark after the initialization, the crystallization accelerating layer provided at the time of forming the recording layer is considered to be mixed with other portions of the recording layer. To accelerate such mixing, it is preferred to employ a combination with the above-mentioned melt initialization. If the crystallization accelerating layer is too thick, recorded signals tend to be deteriorated for from 2 to 5 times of overwriting. On the other hand, if it is too thin, the effect for facilitating the initial crystallization tends to be small. Accordingly, the thickness of the crystallization accelerating layer is usually from 0.2 to 5 nm, preferably at least 1 nm.

The crystallization accelerating layer has a composition which is different from the average composition of the recording layer, and the refractive index is different from the recording layer. Accordingly, if it is too thick, the reflectance after the initial crystallization will be different from a case where no crystallization accelerating layer is present. Likewise, the reflectance will be different as between after the initial crystallization and after repetitive overwriting for e.g. ten times.

To compensate the difference in composition between the recording layer and the crystallization accelerating layer, it is effective to provide a composition-adjusting layer in contact with the crystallization accelerating layer to bring the composition obtained by averaging the compositions of the crystallization accelerating layer and the composition-adjusting layer.

Heretofore, there have been some cases in which a GeSbTe ternary alloy is used for a phase-change medium. However, they are basically those using a $Sb_2Te_3$-GeTe pseudo binary alloy as the base (JP-A-61-89889, JP-A-62-53886 and JP-A-62-152786), and they are substantially different from the compositional range of the present invention. The compositional range of the present invention was, in fact, outside the scope of the composition for practical application to optical recording media in the prior art.

As mentioned above, there has been some cases wherein an alloy having a composition close to the SbTe eutectic is disclosed (U.S. Pat. No. 4,670,345, JP-A-1-115685, JP-A-1-251342, JP-A-1-303643 and JP-A-4-28587), but nothing is disclosed with respect to the application of the recording method suitable for mark length recording as disclosed by the present invention.

Thus, the composition and the multilayer structure of the medium of the present invention represent indispensable improvements to make the alloy close to the $Sb_{70}Te_{30}$ eutectic composition useful for a practical phase-change medium.

Further, the present invention is very important also from the viewpoint that the composition which used to be considered difficult to initialize and impractical as a recording layer, has been found to be suitable for high density recording once it has been initialized.

Still further, it is industrially important that an initialization method suitable for the recording medium of the present invention has been found to carry out initialization in a short period of time.

In the present invention, the reflective layer is provided to positively utilize the optical interference effect to increase the signal amplitude and to let it function as a heat dissipating layer to readily attain a super-cooling state required for forming amorphous marks.

For such purposes, a metal having a high reflectance and a high thermal conductivity is preferred for the reflective layer. Specifically, Au, Ag or Al may, for example, be mentioned. However, to increase freeness for optical design, a semiconductor such as Si or Ge may sometimes be used. From the viewpoint of the economical efficiency and corrosion resistance, an Al alloy having e.g. Ta, Ti, Cr, Mo, Mg, Zr, V or Nb added to Al in an amount of from 0.5 to 10 atomic %, is preferred. Particularly preferred is Ta or Ti.

By utilizing a characteristic such that the thermal conductivity usually decreases as the amount of impurities in Al is large, the thermal conductivity can be controlled. Especially, by an addition of Ta, a highly corrosion resistant material can be obtained (JP-A-1-16975). Further, there is a merit that by a decrease of the purity to the maximum of 10 atomic %, the thermal conductivity can be controlled within a wide range of from $\frac{1}{3}$ to $\frac{1}{4}$ of pure Al.

The composition and the thickness of the reflective layer is optimized with a view to controlling the cooling rate of the recording layer via the upper protective layer for forming amorphous marks.

If it is too thick, the sensitivity is likely to deteriorate. Accordingly, the thickness is preferably at most 200 nm. However, if it is too thin, the cooling effect tends to be inadequate. Accordingly, the thickness is preferably at least 50 nm.

To effectively utilize the cooling effect of the reflective layer, the thickness of the upper protective layer is preferably from 10 to 30 nm.

As a more specific preferred example, and as a multilayer structure to obtain an adequate cooling effect without lowering the recording sensitivity, it is preferred that the thickness of the upper protective layer is rather thick at a level of from 25 to 30 nm, and the reflective layer is made of $Al_{1-b}Ta_b$ ($0.01 \leq b \leq 0.02$) having high thermal conductivity in a thickness of from 50 to 150 nm.

The thicknesses of the recording layer and the protective layers will be described in further detail.

Taking into consideration not only the restrictions from the viewpoint of the mechanical strength and reliability but also the interference effect attributable to the multilayer structure, the thicknesses are selected so that the laser beam absorption efficiency in the recording layer is good and the amplitude of the recorded signals i.e. the contrast between the recorded stated and the unrecorded state, is large.

As mentioned above, the thickness of the upper protective layer is preferably from 10 to 30 nm. The most important reason is that heat dissipation to the reflective layer is most efficiently be carried out. By adopting a multilayer structure to accelerate the heat dissipation and to increase the cooling rate for resolidification of the recording layer, a high erasing ratio can be accomplished by high speed crystallization while avoiding problems involved in recrystallization.

If the thickness of the upper protective layer is thicker than 30 nm, the time until the heat of the recording layer reaches the reflective layer, tends to be long, whereby the heat dissipating effect by the reflective layer will hardly be obtainable. Namely, the reflective layer serves as a pump for pumping out heat, and the upper protective layer serves as a piping to transfer the heat current to the pump.

The protective layer being thick means the piping being long, whereby even if the performance of the pump is high (even if the thermal conductivity of the reflective layer is high), the performance does not effectively function. Especially when the thickness of the protective layer exceeds 25 nm, it will be required to secure the heat dissipating effect by the reflective layer. For this purpose, it will be necessary to employ a reflective layer having a high thermal conductivity and a thickness of at least 100 nm.

As a reflective layer having a high thermal conductivity, an Al alloy having an impurity content of less than 2.0 atomic %, may be mentioned. Further, Au or Ag is preferred from the viewpoint of the high thermal conductivity.

The flow rate of a piping may also depend upon the thickness of the piping i.e. upon the thermal conductivity of the upper protective layer. However, the thermal conductivity of a thin film of less than 100 nm is usually smaller by from 2 to 3 figures than the thermal conductivity of the bulk of the same material. Accordingly, the difference due to the material will be small, and the thickness will be an important factor.

On the other hand, if the upper protective layer is thinner than 10 nm, it is likely to break due to e.g. deformation during melting of the recording layer, such being undesirable. This is undesirable also from such a viewpoint that the heat dissipating effect tends to be too large and the power required for recording tends to be unnecessarily large.

The multilayer structure proposed here is called "rapid cooling structure" for a phase-change medium and is per se known (JP-A-2-56746 and Jpn. J. Appl. Phys., vol. 28 (1989), suppl. 28-3, p 123).

In the present invention, this rapid cooling structure is used in combination with the following recording method to accurately control the cooling rate during resolidification of the recording layer, whereby it is possible to fully attain the feature of the recording layer material of the present invention suitable for mark length recording.

Figure 4:
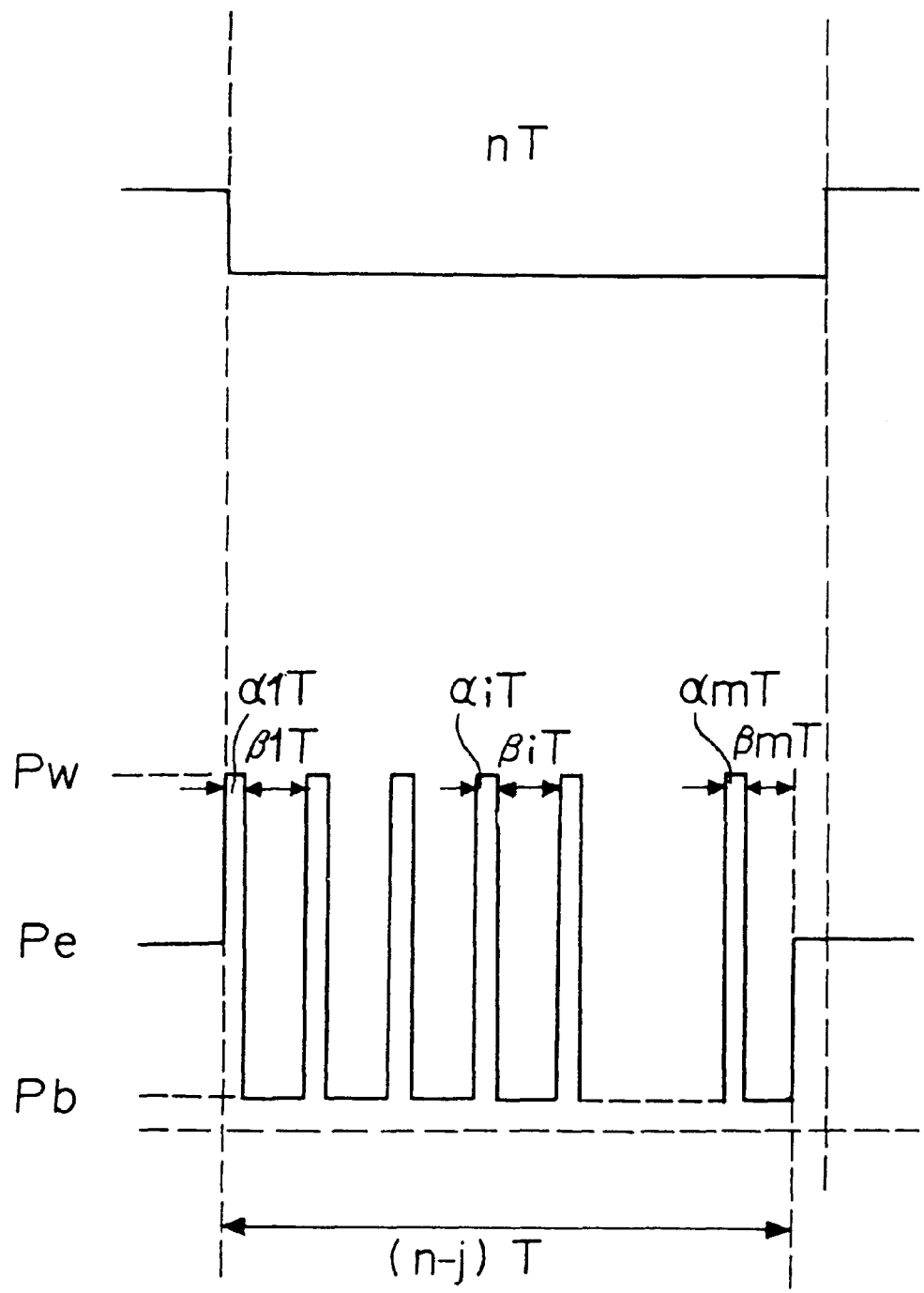
FIG. 4 is a view showing an example of the irradiation pattern of a laser power during optical recording.

FIG. 4 is a view illustrating one embodiment of the irradiation pattern of a laser power during optical recording in the mark length modulation recording. The Figure illustrates an embodiment wherein an amorphous mark having a length nT, where T is a clock period, and n is a natural number of at least 2, is formed so that nT represents a mark length obtainable in the mark length modulation recording.

When a mark having a length nT is recorded to the recording medium of the present invention, the laser application period is divided into m=n−k (k is an integer of $0 \leq k \leq 2$, provided that $n_{min}-k \geq 1$, where $n_{min}$ is the minimum value of n) recording pulses, whereby each recording pulse width (the period for application of writing power Pw) is represented by $\alpha_i T$, and an off pulse period of time represented by $\beta_i T$ is attached to each recording pulse. During the off pulse period, bias power Pb of $0 < Pb \leq 0.5$ Pe is applied, (provided that when $2 \leq i \leq m-1$, $\alpha_i < \beta_i$).

Here, so that an accurate nT mark can be obtained at the time of retrieving the amorphous mark, the laser application period can be adjusted as follows:

$\alpha_i + \beta_i + \ldots + \alpha_m + \beta_m = n-j$, where j is a real number of $0 \leq j \leq 2$.

With the medium of the present invention, it is preferred to carry out recording/erasing by a three power level modulation wherein the above-mentioned off pulse period is provided for bias power Pb, rather than by a two power level modulation with writing power Pw and erasing power Pe as heretofore employed in a conventional $GeTe-Sb_2Te_3$ pseudo binary alloy system. Overwriting by the two power level modulation may be used, but by employing the three power level modulation system, the power margin and the linear velocity margin for recording can be broadened.

With the recording layer of the present invention, it is particularly preferred to adjust bias power Pb for the off pulse period to a sufficiently low level so that $0 < Pb \leq 0.5$ Pe.

Further, erasing power Pe is a power which is capable of accomplishing recrystallization of amorphous mark portions with irradiation of less than 100 nano seconds, and writing power Pw is a power which is sufficient for melting the recording layer in a time of $\alpha_i T$ and Pw>Pe.

Figure 5:
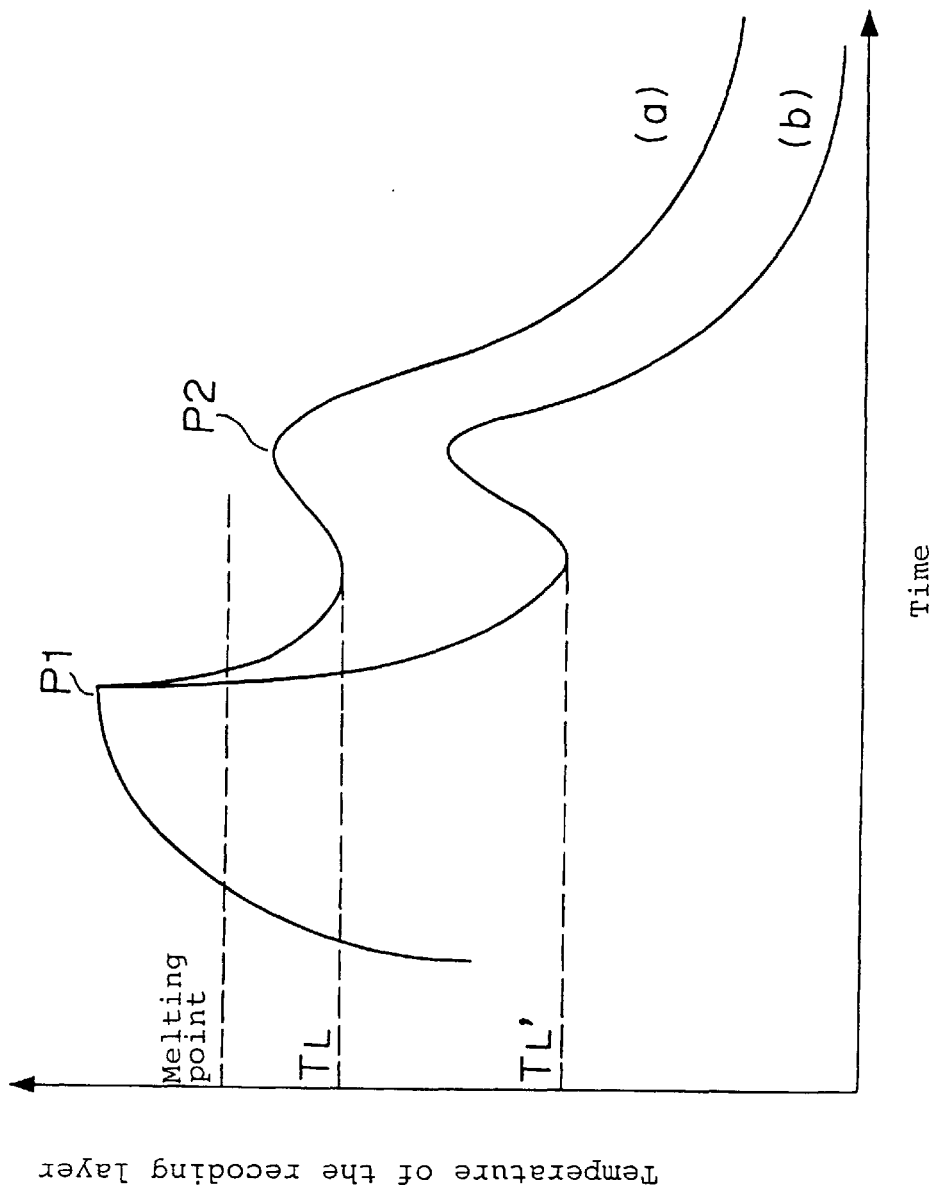
FIG. 5 is a graph showing the temperature change of the recording layer when optical recording was carried out on the medium of the present invention.

FIG. 5 is a schematic graph illustrating the temperature change of the recording layer when optical recording is carried out on the medium of the present invention. This is case wherein the laser application period is divided into two (m=2), and a first recording pulse (writing power), a first off pulse (bias power), a second recording pulse and a second off pulse are sequentially irradiated to form an amorphous mark, and (a) represents a case where $\alpha_i=\beta_i=0.5$, and Pb=Pe, and (b) represents a case where $\alpha_i=\beta_i=0.5$, and Pb is substantially 0 (provided that P≠0).

As the recording position, a position of the recording layer where the rear end of the first recording pulse is irradiated, is assumed.

In the case of (a), even during the off pulse period, Pe is applied, whereby the influence of the heating by the subsequent recording pulse extends forwardly, and the cooling rate after irradiation of the first recording pulse is slow, and the lowest temperature $T_L$ to which the temperature reaches by the temperature drop during the off pulse period, is still in the vicinity of the melting point.

On the other hand, in the case of (b), Pb during the off pulse period is substantially 0, whereby the lowest temperature $T_L'$ will be sufficiently lower than the melting point, and the cooling rate is high. The amorphous mark is melted during irradiation of the first recording pulse and then is formed by quenching during the subsequent off pulse period.

As mentioned above, in the medium of the present invention, the recording layer shows a high crystallization speed only in the vicinity of the melting point.

Accordingly, to take the temperature profile as shown by (b) in FIG. 5, is important to suppress recrystallization and to obtain a good amorphous mark.

In other words, by controlling the cooling rate and the lowest temperature $T_L$, it is possible to completely control the recrystallization and to form an amorphous mark having a clear outline which substantially corresponds to the melted region, whereby a low jitter is attainable at the edge of the mark. In the above recording pulse dividing method, 0<Pb≦0.2Pe is more preferred. However, at $\beta_m T$, 0<Pb≦Pe is acceptable.

Further, it is more preferred that when 2<i<m−1, $\alpha_i+\beta_i=$ 1.0, and $0.05<\alpha_i\leq 0.5$, since it is thereby possible to effectively obtain the cooling effect during the off pulse period.

On the other hand, with a GeTe-Sb$_2$Te$_3$ pseudo binary alloy, there is no substantial difference in the amorphous mark-forming process whether either temperature profile (a) or (b) in FIG. 5 is used. Because it shows recrystallization within a wide temperature range, although the speed is somewhat slow. In such a case, irrespective of the divided pulse method, recrystallization takes place to some extent, whereby coarse grains will form along the periphery of the amorphous mark, thus deteriorating the jitter at the edge of the mark. With this recording layer composition, it is advisable to carry out overwriting by conventional simple two power level modulation rather than adopting the off pulse.

Namely, for the recording layer of the present invention, the off pulse is suitable, but such off pulse is not necessarily suitable when applied to conventional GeTe-Sb$_2$Te$_3$ type recording layer or when the recording layer of the present invention is applied to the mark position recording as shown in Examples of JP-A-1-303643.

Now, on the basis of the multilayer structure of the present invention, a construction of a rewritable medium which is compatible with CD, although the reflectance is low, will be described in detail. To secure the compatibility as CD-RW, the modulation stipulated by CD standards must be taken at a high level.

Figure 6:
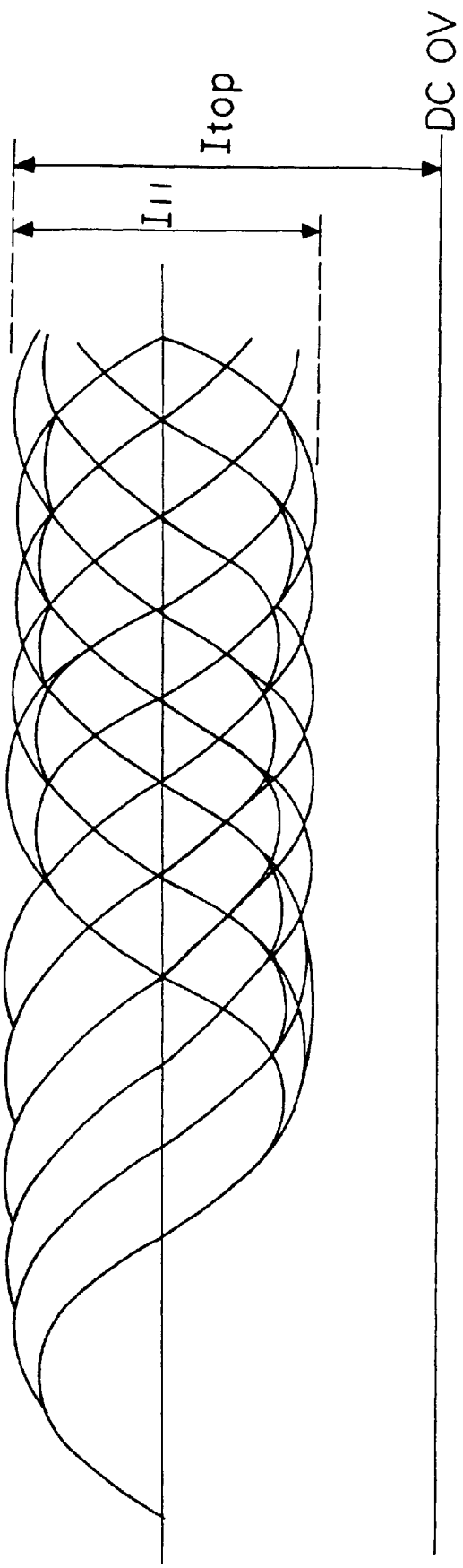
FIG. 6 is an explanatory view for the modulation.

The modulation is defined by a ratio of $I_{11}/I_{top}$, where $I_{top}$ is the top signal level of an EFM signal and $I_{11}$ is the signal amplitude in the DC retrieving signal (the retrieving signal containing a direct current component) when EFM signal is recorded as shown in FIG. 6.

$I_{top}$, in fact, corresponds to the reflectance in the groove of an unrecorded inter-mark portion (crystalline state).

$I_{11}$ depends on the intensity difference and the phase difference of reflected lights from the crystalline portion and the amorphous portion of a phase-change medium.

The intensity difference of the reflected lights is determined basically by the difference in reflectance between the crystalline state and the amorphous state.

On the other hand, in a case where the amorphous mark recorded in a groove narrower than a width of 1 µm, is read out by a focused laser beam having a diameter of the same level, interference of a plane wave must be taken into consideration. Namely, it is necessary to take into consideration the phase difference between the reflected lights from the amorphous mark and the crystalline state.

Figure 7:
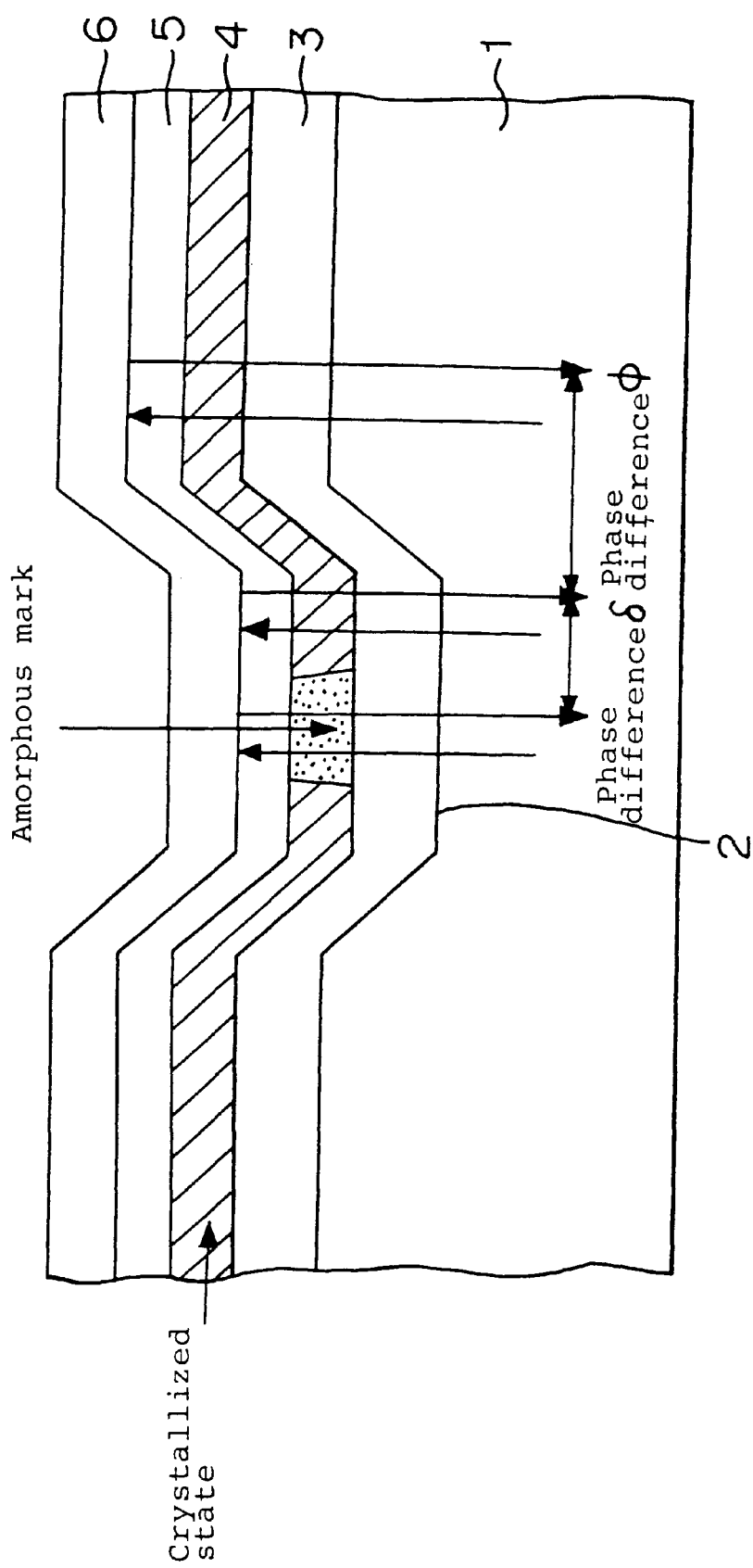
FIG. 7 is an explanatory view for the phase difference.

The phase difference δ is defined by the following formula, in a case where a recording medium having the above described multilayer structure is irradiated by a retrieving laser beam from the rear side of the substrate to read out the reflected light (see FIG. 7):

δ=(phase of the reflected wave passed through the crystalline region)−(phase of the reflected wave passed through the amorphous region) (2)

δ being negative means that the phase of the amorphous state is progressing, and δ being positive means that the phase of the crystalline state is progressing.

On the other hand, when recording is carried out in a groove, a phase difference due to the groove depth represented by the following formula, will result.

φ=(phase of the reflected wave from the groove)−(phase of the reflected wave from the land) (3)

From the beam incident to the substrate surface, the land is located far, and the phase accordingly advances, whereby φ<0. If φ is added to δ, a local interference of a plane wave takes place in the focused laser beam, whereby the reflectance of the amorphous portion recorded in the groove decreases, and a contrast greater than a mere difference in the reflectance between the crystalline state and the amorphous state, may sometimes be obtained. The condition for this is:

$$-\pi<\delta<0 \qquad (4)$$

However, the phase can be irreducible in a cycle of 2π. (i.e. eq (4) can be replaced by π<δ<2π)

In the quadri-layer structure having the lower protective layer, the recording layer, the upper protective layer and the reflective layer provided on the substrate of the present invention, the dependency on the thickness of the lower protective layer is most remarkable.

Figure 8:
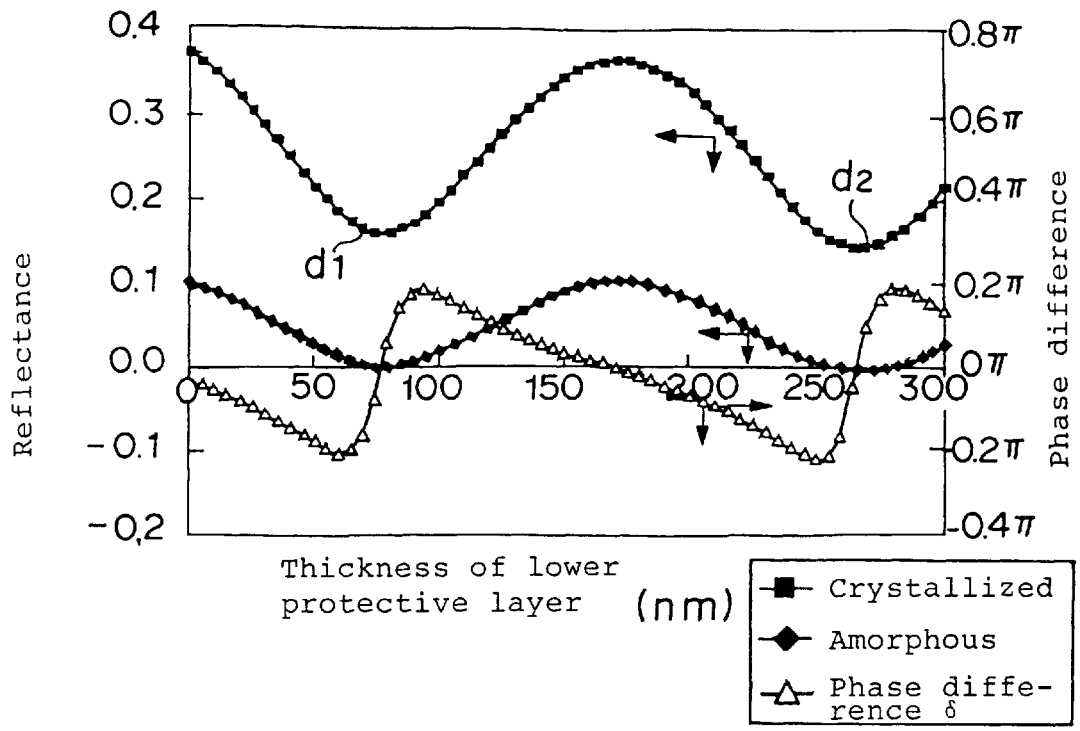
FIG. 8 is an explanatory view for the reflectance in a quadri-layer structure and the phase difference δ between the crystalline state and the amorphous state.
Figure 8:
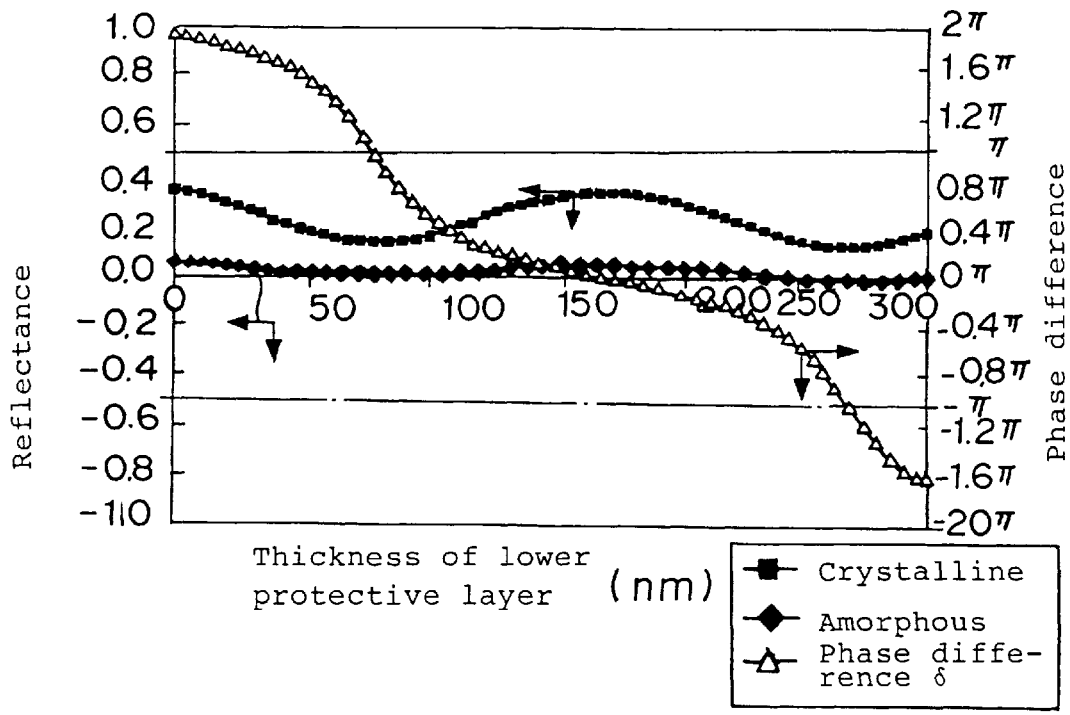

FIG. 8 illustrates an example of calculation of the reflectance and the phase difference δ between the crystalline and amorphous states in the typical quadri-layer structure.

FIG. 8(*a*) represents a case of an Ag$_5$In$_6$Sb$_{60}$Te$_{29}$ recording layer as an example of the recording layer material of the present invention, and FIG. 8(*b*) represents a case of Ge$_{22}$Sb$_{25}$Te$_{43}$ recording layer which is a prospective phase-change medium material but unsuitable for the present invention.

As the refractive indices of the respective layers, actually measured values were used.

Further, the recording layer, the upper protective layer and the refractive layer were 20 nm, 22.5 nm and 200 nm, respectively.

Further, it should be noted that the scale of the ordinate is different between FIG. 8(a) and FIG. 8(b).

So long as the dependency on the lower protective layer is concerned, the change in the amplitude is usually small, and the modulation strongly depends on $I_{top}$ as the denominator i.e. the reflectance in the crystalline state.

Accordingly, the reflectance in the crystalline state is desired to be as low as possible.

In the calculation example of FIG. 8, $(ZnS)_{80}(SiO_2)_{20}$ with n=2.1, was used, whereby at the first minimum value $d_1$, the thickness was from 60 to 80 nm, and at the second minimum value $d_2$, the thickness was from 250 to 270 nm. The reflectance changes periodically thereafter.

The thickness of the lower protective layer at which the reflectance in the crystalline state becomes minimum, is determined substantially solely by the refractive index of the protective layer in the case of a recording layer having a high reflectance. This is apparent from the fact that in each of FIGS. 8(a) and 8(b), the minimum points are substantially the same.

By multiplying 2.1/n by $d_1$ or $d_2$, the thickness at the minimum point with other refractive index n can be obtained. However, since n is usually from 1.8 to 2.3, $d_1$ is only at a level of 85 nm at most. If the refractive index of the lower protective layer is smaller than 1.8, the reflectance at the minimum point increases, whereby the modulation degree substantially decreases to a level of lower than 0.5, such being undesirable.

On the other hand, if the refractive index exceeds 2.3, the reflectance at the minimum point tends to be too low to accomplish 15%, whereby focusing or tracking servo tends to be difficult, such being undesirable.

With respect to the phase difference δ, it is desired that the phase of the amorphous state progresses, as mentioned above. However, if the influence is large, servo tends to be unstable, since the same effect as a change of the groove geometry which takes place simultaneously with recording, will form. Especially in the vicinity where the sum of the phase difference φ due to the groove depth and the phase difference δ between the crystalline and amorphous states, becomes π, a push-pull signal tends to be hardly obtainable, such being undesirable.

In FIG. 8(b), in the vicinity of the minimum point of the reflectance in the crystalline state, the phase difference δ becomes close to π, such being undesirable.

In the present invention, the phase difference φ due to the groove depth is only at a level of 0.35π at the highest. The phase difference |δ| between the crystalline and amorphous states is preferably less than 0.5π.

Further, it is also undesirable that the phase difference δ abruptly changes as the thickness of the lower protective layer changes.

It is evident that the $Ge_{22}Sb_{25}Te_{43}$ recording layer is not suitable for the recording medium of the present invention utilizing the minimum point in reflectance, although it is close to the $Ge_2Sb_2Te_5$ composition which is prospective as a phase-change medium.

With a recording layer of the present invention having an additional element added in an amount of about 30 atomic % to a composition close to the $Sb_{70}Te_{30}$ eutectic point, substantially the similar optical properties as in FIG. 8(a) can be obtained.

This represents a substantial difference in the point of aim between the present invention and other inventions made with respect to a conventional $GeTe/Sb_2Te_3$ pseudo binary alloy.

In general, with a dielectric protective layer irrespective of a mixed film such as $ZnS:SiO_2$ or a compound such as $Ta_2O_5$, the deposition rate by sputtering is very slow and less than one third as compared with a metal film. Therefore, the film thickness at the second minimum value in the Figure is not desirable, since it takes a long time for film forming.

From the viewpoint of the productivity, the thickness of the lower protective layer is preferably less than 150 nm. Because, currently, the film forming speed by sputtering for a dielectric protective layer is at a level of 15 nm/sec, and if it takes more than 10 seconds for the film forming, the cost will increase.

Further, the allowance in the variation in the thickness tends to be severe, which is undesirable from the viewpoint of the productivity.

Namely, as is evident from FIG. 8, if the thickness departs by Δd from the desired thickness $d_0$, the reflectance changes to the same extent irrespective of in the vicinity of the first minimum value $d_1$ or in the vicinity of the second minimum value $d_2$.

On the other hand, the thickness distribution difference for the practical production is determined by a percentage (%) relative to $d_0$, and usually $d_0±2$ to 3% is the limit for uniformity.

Accordingly, the smaller $d_0$, the smaller the variation width Δd in the film thickness, and such is advantageous, since the variation in the reflectance in the disk plane or among disks can be suppressed.

By an inexpensive stationary opposing type sputtering apparatus having no substrate self rotating mechanism, it is obliged to adopt the film thickness in the vicinity of the mass-producible first minimum value $d_1$.

If an importance is placed on the repetitive overwriting durability, a film thickness of at least 200 nm may be employed. However, for the purpose of CD-RW media, durability of at least 1,000 times is considered to be adequate, and a thickness in the vicinity of $d_1$ is usually selected from the viewpoint of the cost performance.

On the other hand, to prevent the deformation of the substrate, the lower protective layer is required to have a certain thickness.

Figure 9:
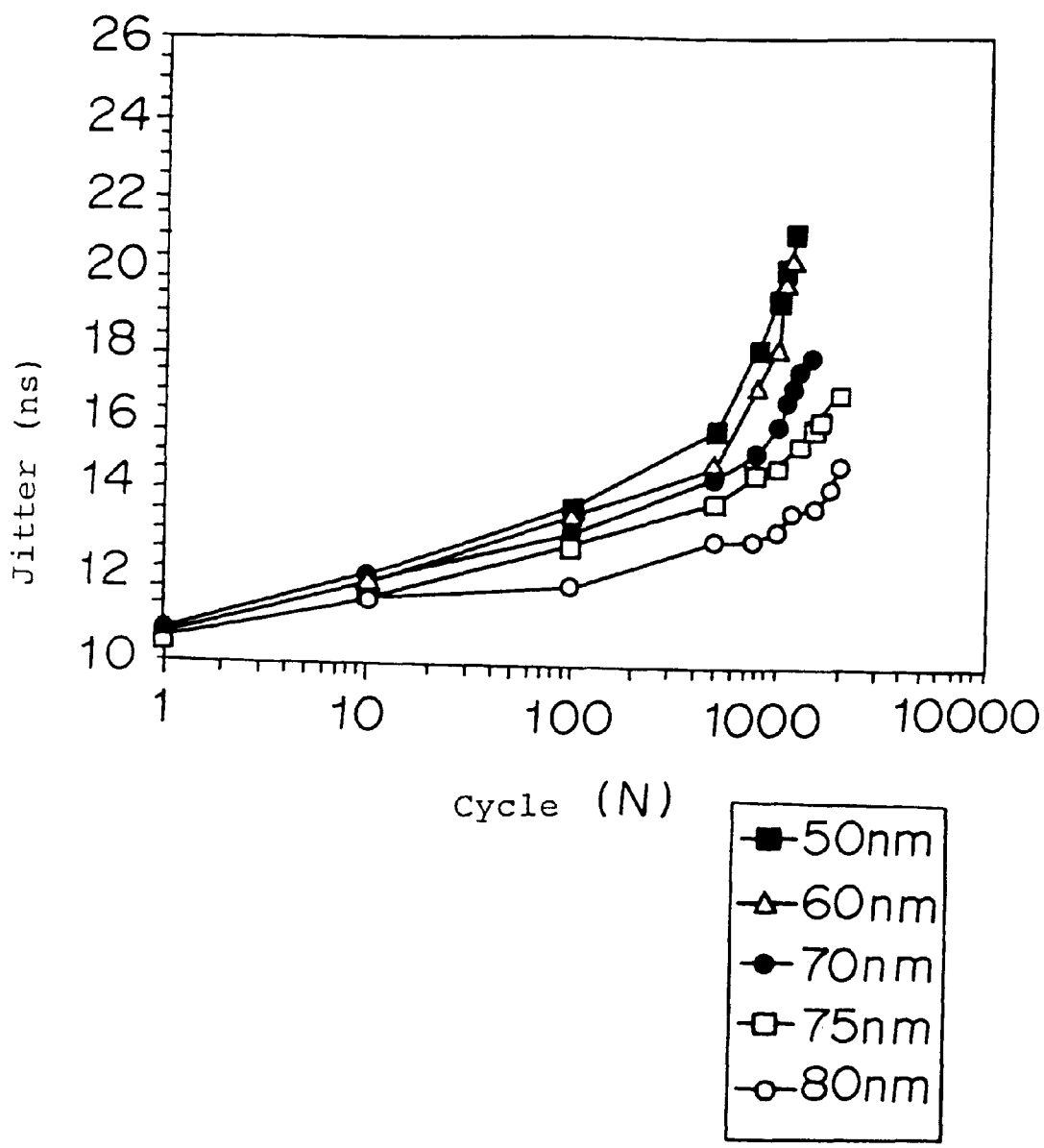
FIG. 9 is a view illustrating the relation between the overwriting durability and the thickness of the lower protective layer.

FIG. 9 shows the dependency of the repetitive overwriting durability on the thickness of the lower protective layer. The groove width was substantially constant at 0.55 μm.

If the thickness of the lower protective layer becomes less than 70 nm, the durability abruptly deteriorates. Especially, the jitter abruptly increases at the initial stage where the number of repetitive overwriting is less than a few hundreds times. The deterioration of the jitter during the initial stage of the repetitive overwriting depends largely on the thickness of the lower protective layer.

From the observation by an atomic force microscope (AFM), it was found that this initial deterioration was due to a depressing deformation of the substrate surface by from 2 to 3 nm.

To prevent the deformation of the substrate, the protective layer is required to have a thickness sufficient for a heat insulating effect not to transmit the heat generation of the recording layer and sufficient to mechanically suppress the deformation. It is evident that to attain the durability of at least 1,000 times required for a medium of this type, the thickness is required to be at least 70 nm, preferably at least 80 nm.

With the lower protective layer in the vicinity of n=2.1 in FIG. 8(a) i.e. the lower protective layer having n of from 2.0 to 2.2, a thickness of at least 70 nm is preferred which is a thickness where the reflectance becomes minimum. More preferably, the thickness is at least 80 nm. Further, in order to minimize the change in reflectance due to a change in the film thickness, the thickness is preferably at most 90 nm.

Accordingly, in order to realize the overwriting durability of at least 1,000 times required for a rewritable medium of this type while maintaining a high modulation, it is necessary to aim at a film thickness as thick as possible while $I_{top}$ is maintained in the vicinity of the minimum value.

In such a case, as is apparent from FIG. 8, the phase difference δ shifts towards a direction where a signal amplitude can hardly be obtained. However, even in a state of δ>0, where the crystalline state phase progresses, there is no problem so long as |δ|<0.5π.

If δ>0.5π, the phase difference δ adversely affects, whereby an amplitude expected from the difference in reflectance can not be obtained. The requirement in this respect is to employ a film thickness thicker by more than 0 nm and not more than 30 nm than $d_1$ at the first minimum point of reflectance.

As a second embodiment of the present invention, a medium which positively utilizes the above phase difference δ, may be mentioned. Optically, this is preferred in that the modulation can be made larger with the same difference in reflectance.

For this purpose, it is preferred to employ a lower protective layer thinner by more than 0 nm and not more than 30 nm than the thickness at the minimum point of reflectance.

However, as is apparent from FIG. 9, the repetitive overwriting durability is inadequate.

Figure 10:
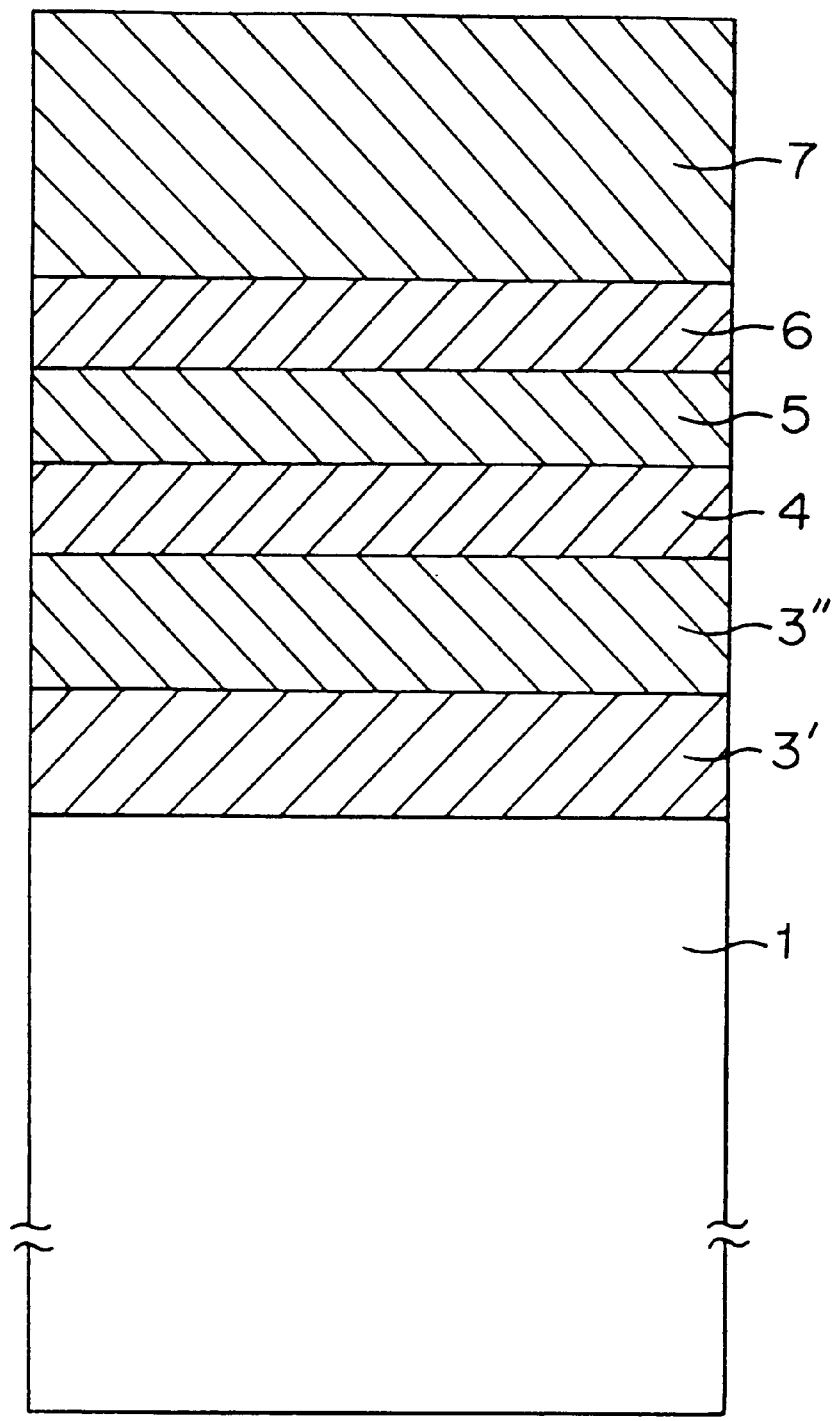
FIG. 10 is a schematic view illustrating an embodiment of the optical recording medium of the present invention.

To solve this problem, it is advisable to separate the lower protective layer 3 into two layers of a first lower protective layer 3' and a second lower protective layer 3", as shown in FIG. 10.

Designing of the multilayer structure except the first lower protective layer 3' is made preferentially taking the optical properties into consideration, and the thickness of the second lower protective layer 3" is adjusted to be thinner by more than 0 nm and not more than 30 nm, preferably from 2 to 30 nm, than the thickness at the minimum point of reflectance.

The thickness of the lower protective layer is at least 70 nm in the total of the first lower protective layer 3' and the second lower protective layer 3". This structure is used to increase the mechanical strength and to improve the repetitive overwriting durability.

In such a case, by adjusting the refractive index $n_1$ of the first lower protective layer and the refractive index $n_{sub}$ of the substrate to be substantially equal, it becomes possible to freely design the film thickness independently from the optical design.

Namely, the optical requirements and the durability requirements can be optimized independently from each other. It is ideal that $n_1$ and $n_{sub}$ are exactly the same, or the difference is less than 0.05. However, there is no practical problem so far as the difference is less than 0.1.

A typical polycarbonate resin substrate has $n_{sub}$ of 1.55. Accordingly, it is advisable to use a dielectric material having $n_1$ of from 1.5 to 1.6.

As such a material, a mixture of $SiO_2$, SiC and $Y_2O_3$, or a mixture of ZnS, $SiO_2$ and $MgF_2$ or $CaF_2$, is preferred, since such a mixture itself is excellent in durability.

By thus adopting a multilayer structure taking into consideration the high modulation and the balance of the productivity and the repetitive overwriting durability, the compatibility with CD can substantially be maintained except that the recording signal quality is of a low reflectance.

Now, it will be shown by Test Examples that when compatibility of groove signals is taken into consideration, a phenomenon of deterioration by repetitive overwriting attributable to the groove geometry becomes problematic.

On an injection molded polycarbonate substrate having diameter of 120 mm and a thickness of 1.2 mm, a groove was formed in a spiral form with a groove pitch of 1.6 μm, a groove width of about 0.5 μm and a depth of about 40 nm. The groove had a wobble formed in a transverse direction with a frequency of 22.05 kHz.

The wobble applitudes were four types of 27 nm, 20 nm, 13.5 nm and 0 nm (no wobble).

The wobble applitudes were measured by a measuring method provided for in the CD-RW standards (Orange Book part 3), but the absolute values themselves are merely values for reference and not critical so long as the relative relations can be controlled.

On this substrate, 100 nm of $(ZnS)_{80}(SiO_2)_{20}$ (mol %) as a lower protective layer, 20 nm of $Ag_5In_6Sb_{61}Te_{28}$ as a recording layer thereon, 20 nm of $(ZnS)_{80}(SiO_2)_{20}$ as an upper protective layer and 100 nm of $Al_{97.5}Ta_{2.5}$ as a reflective layer, were sequentially laminated, and an ultraviolet ray curable resin (SD 318, manufactured by Dai Nippon Ink) was coated thereon in a few micrometer to obtain a phase-change medium.

Recoding was carried out in the groove to form amorphous marks in the crystalline region.

To this medium, repetitive overwriting was carried out at a so-called double speed of CD (2.8 m/s) using EFM random signals for recording marks with a length of from 3 T to 11 T relative to standard clock period of T, as shown in FIG. 11(a). The EFM signals are used in the CD standards.

Recording was carried out in such a manner that the signal for each length is divided into pulses as shown in FIG. 11(b), whereby writing power Pw was 11 mW, erasing power Pe was 6 mW, and bias power Pb was 0.8 mW.

The signal quality was evaluated by the severest 3 T jitter.

The results are shown in FIG. 12. According to the CD standards, the jitter is required to be smaller than 17.5 nsec at the double speed (2.8 m/s).

As is evident from FIG. 12, with a groove having no wobble amplitude, no substantial deterioration of jitter was observed even after overwriting repeated for 10,000 times, but as the wobble amplitude increases, the deterioration becomes distinct.

It is evident that the deterioration becomes remarkable after overwriting repeated for 1,000 times.

Figure 13:
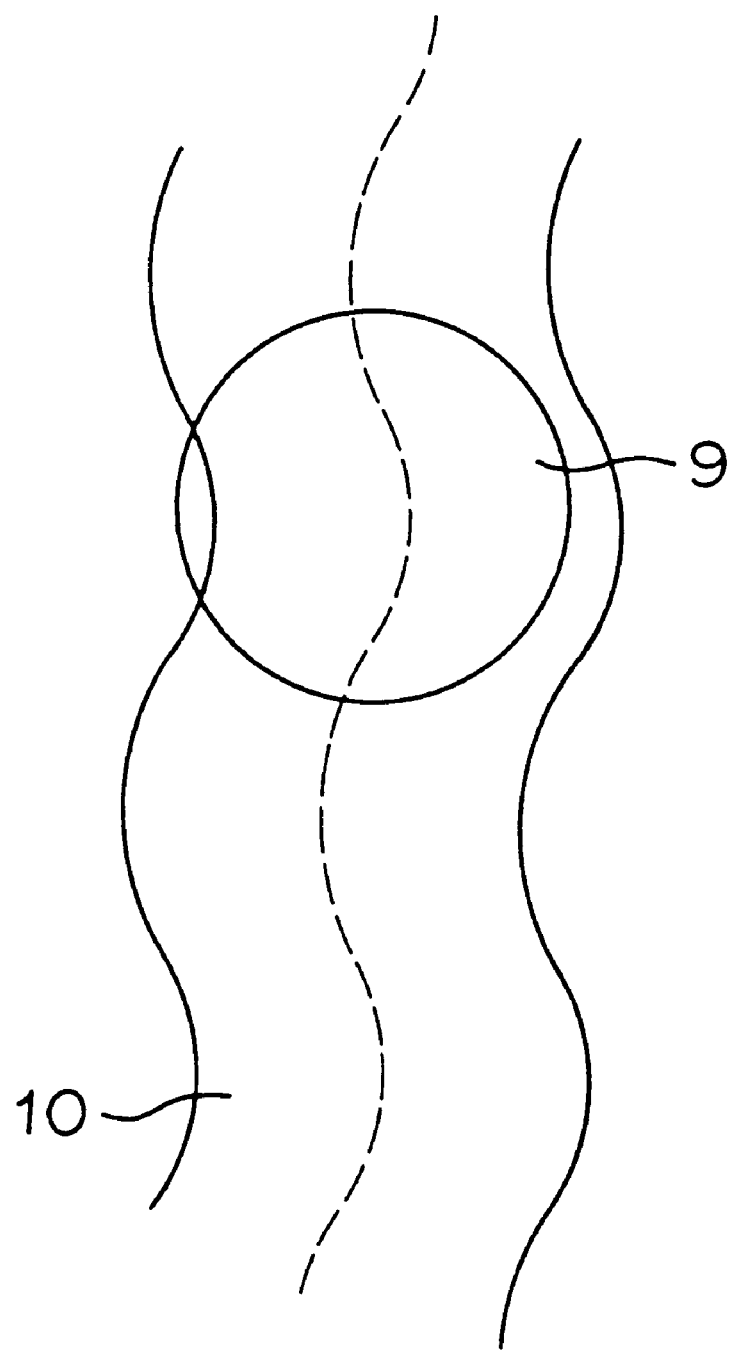
FIG. 13 is a view illustrating the relation between the wobble and the recording laser beam.

The mechanism for acceleration of the deterioration due to the presence of a wobble is not clearly understood. However, as shown in FIG. 13, it may be attributable to the fact that the side walls of the grooves tend to be irradiated with a part of the recording laser beam 9. Namely, the focused laser beam 9 under a tracking servo advances straight on along the center of the groove without following the meandering of the wobble.

As shown in FIG. 13, if there is wobbling of the groove wall 10, the laser beam 9 is likely to be irradiated to the groove wall (in the Figure, the wobble amplitude is drawn as exaggerated, but this tendency is believed to be correct).

It is considered that the groove wall 10 is susceptible to deterioration by heat damage during repetitive overwriting for such a reason that a stress is likely to collect at the groove wall portion or at the groove corner portion where the adhesion of the thin film is poor, and if a laser beam is applied even slightly to such a groove wall, the deterioration may be accelerated.

Figure 14:
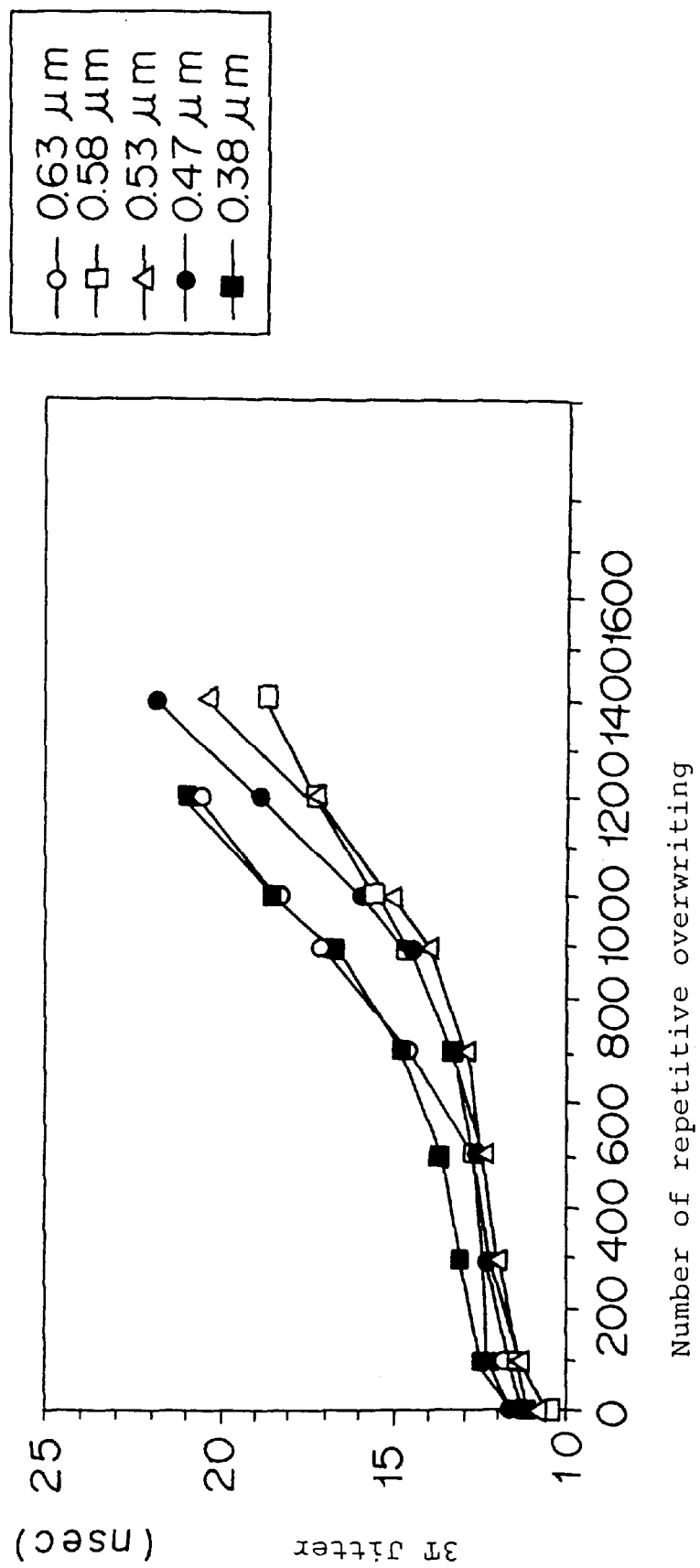
FIG. 14 is a view illustrating the change of the overwriting characteristic due to the groove width.

Therefore, the number of repetitive overwriting was measured by changing the groove width at levels of 0.38, 0.47, 0.53, 0.58 and 0.63 μm, while maintaining a wobble amplitude of 20 nm and a groove depth of 31 nm to be constant. The results are shown in FIG. 14.

The measuring method and the multilayer structure were the same as in FIG. 12. The initial jitter was about 10 nsec in each case.

In groove recording of a phase-change medium, there is a tendency that the durability is good as the groove is deep and narrow. However, when a wobble is present, if the groove width is too narrow, the above-mentioned phenomenon of deterioration of the groove wall tends to be remarkable, and the deterioration is apparently substantial.

Namely, there is a restriction to the groove width from the viewpoint of the repetitive overwriting durability, and the groove width is preferably from 0.4 to 0.6 μm, more preferably from 0.45 to 0.55 μ.

From the viewpoint of compatibility with CD, it is necessary to take groove signals into consideration (for example, as disclosed in JP-A-8-212550). The groove geometry specifically disclosed as preferred in this publication, is such that the groove depth is from 50 to 60 nm, and the groove width is from 0.3 to 0.6 μm.

From the study by the present inventors, it has been found that with the above multilayer structure taking into consideration the modulation, the productivity and the repetitive overwriting durability, unless the groove depth is less than 45 nm, the push-pull value after recording tends to be excessively larger than 0.1, and the radial contrast value after recording tends to be excessively large at a level of at least 0.6 as compared with a value of from 0.1 to 0.2 before recording, whereby there will be a problem in the stability of servo.

Here, the radial contrast RC is defined as follows:

$$RC = 2(I_L - I_G)/(I_L + I_G) \quad (5)$$

Here, $I_L$ and $I_G$ are the intensities of the reflected lights from the land portion and the groove portion, respectively.

The reflected light intensity is a sum signal $I_1 + I_2$ of light detectors disposed on both sides of the track center.

Practically, the intensities at the groove portion and the land portion of the track-cross signal obtained under a focus servo alone, are measured.

The radial contrast is defined before and after recording.

The radial contrast after recording is calculated by using the intensity obtained by averaging the signal intensities of the reflection-reduced portions by a low pass filter.

On the other hand, the push-pull value PPa after recording is defined likewise by using an average value of the difference signal $|I_1 - I_2|$ as follows:

$$PPa = |I_1 - I_2|/I_{top} \quad (6)$$

Namely, this is a push-pull signal output after passing through a low pass filter having a cut off frequency of from 5 to 10 kHz.

Each of them is a common definition (described in detail in e.g. "Compact Disk Dokuhon", coauthored by Heitaro Nakajima and Hiroshi Ogawa, Ohm-sha, first edition, chapter 6, section 6). More specifically, they are described in the CD standards (Red Book, Orange Book).

The above publication (JP-A-8-212550) defines e.g. the groove signal relating to the drive design. However, with respect to the specific structure of the disk to carry out the design, the thickness of the lower protective layer used in Examples is 200 nm, and the recommended value for the groove depth specifically exemplified is as deep as from 50 to 60 nm.

The recommended value for the groove depth being large in the above publication is considered to be due to the fact that the lower protective layer is far thick beyond the range of the present invention. Namely, if the lower protective layer is thick, the groove is embedded therewith so that the groove as observed on the recording layer surface will be substantially shallow. Accordingly, it may have been required to set the groove to be rather deep.

The present invention is substantially different in the overall design concept from the above publication in that not only optical properties, but also the balance of reliability and productivity, is taken into consideration to design the multilayer structure and the groove geometry of the recording medium. Accordingly the effective ranges are different.

On the other hand, if the groove depth is set to be too shallow, production of the stamper or molding of the substrate tends to be difficult, or the radial contrast signal or the push-pull signal tends to be lower than the lower limit of the standards. Therefore, the groove can not be made shallower than 25 nm.

Taking into consideration the dependency of the repetitive overwriting durability on the groove depth, the groove depth is more preferably from 30 to 40 nm.

The groove width is preferably at least 0.5 μm from the viewpoint of the radial contrast and preferably at most 0.6 μm from the viewpoint of the overwriting durability related to the wobble and the groove geometry.

If the width is wider than 0.6 μm, deterioration of the overwriting durability tends to be remarkable as a general phenomenon of a phase-change medium. On the other hand, if the groove width is narrower than 0.4 μm, deterioration of the overwriting durability due to the presence of a wobble tends to be remarkable, such being undesirable.

More preferably, the groove width is from 0.45 to 0.55 μm.

The present invention is based on a discovery of a specific means to overcome various restrictions resulting from an attempt to produce a rewritable medium compatible with CD although the reflectance is low and to take a balance among trade off factors beyond a mere optimization procedure.

If the individual elements are observed separately, they may not be superior to the prior art of a phase-change medium technology, but the value for industrial application of the rewritable medium compatible with CD is substantial.

Now, specific embodiments of the CD-RW medium which have accomplished high reliability and high productivity while satisfying the compatibility with CD, will be described with reference to Examples. However, it should be understood that the present invention is by no means restricted to such specific Examples.

EXAMPLE 1 AND COMPARATIVE EXAMPLE 1

Summarized in Tables 1 and 2, are the repetitive overwriting durability, the optical properties and the groove signal properties when the groove width and the groove depth were changed while maintaining the wobble amplitude to be constant. Table 1 shows Examples within the scope of the present invention, and Table 2 shows Comparative Examples outside the scope of the present invention.

The multilayer structure employed in the experiments was such that the lower protective layer of $(ZnS)_{80}(SiO_2)_{20}$ was 80 nm, the recording layer of $Ag_5In_5Sb_{60}Te_{30}$ was 20 nm, the upper protective layer of $(ZnS)_{80}(SiO_2)_{20}$ was 23 nm, and the reflective layer of $Al_{98}Ta_2$ was 100 nm.

The film density of the protective layers of $(ZnS)_{80}(SiO_2)_{20}$ was 3.5 g/cm$^3$, which was 94% of the theoretical bulk density of 3.72 g/cm$^3$. All of the thin films in the multilayer structure were prepared by sputtering without breaking a vacuumed condition.

Further, the substrate was prepared by injection molding.

The compositions of the layers were confirmed by a combination of fluorescent X-ray analysis, atomic absorption analysis and X-ray excitation photoelectron spectrometry.

The recording layer in the as-deposited state was amorphous, and the entire area was crystallized to an initial (unrecorded) state by irradiating the disk surface with an elliptic laser diode beam having a long axis of 70 μm and a short axis of about 2 μm with an initialization power of 500 mW at a linear velocity of 3 m/s by a bulk eraser (POP 120, tradename, manufacture by Hitachi Computer Kiki).

With this power, the recording layer is considered to have once melted and crystallized during resolidification.

The thickness of the lower protective layer is thicker by 5 nm than $d_1$=75 nm at the minimum point of the reflectance of FIG. 8.

The substrate was a polycarbonate substrate (n=1.54) having a thickness of 1.2 mm, and a wobbled groove was formed with a pitch of 1.6 μm, by injection molding in accordance with the CD-RW standards (Orange Book part 3) with respect to e.g. the amplitude, the cycle and the modulation signal.

Figure 11:
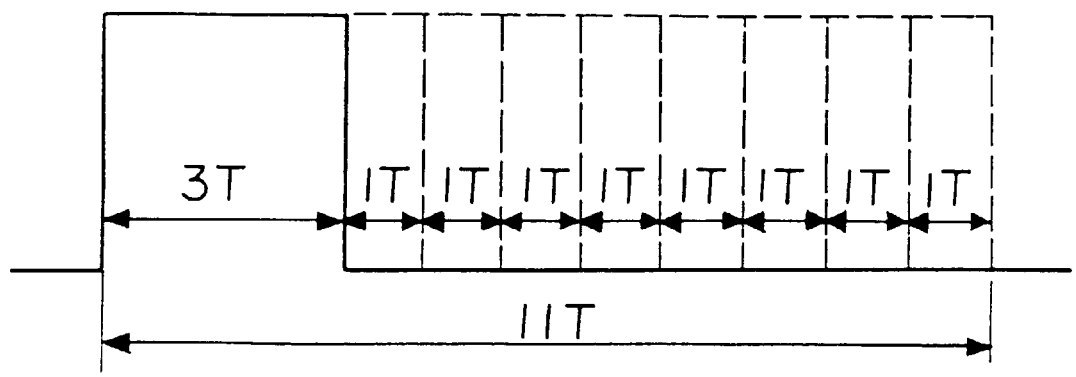
FIG. 11 is a view illustrating an embodiment of the EFM random signals.
Figure 11:
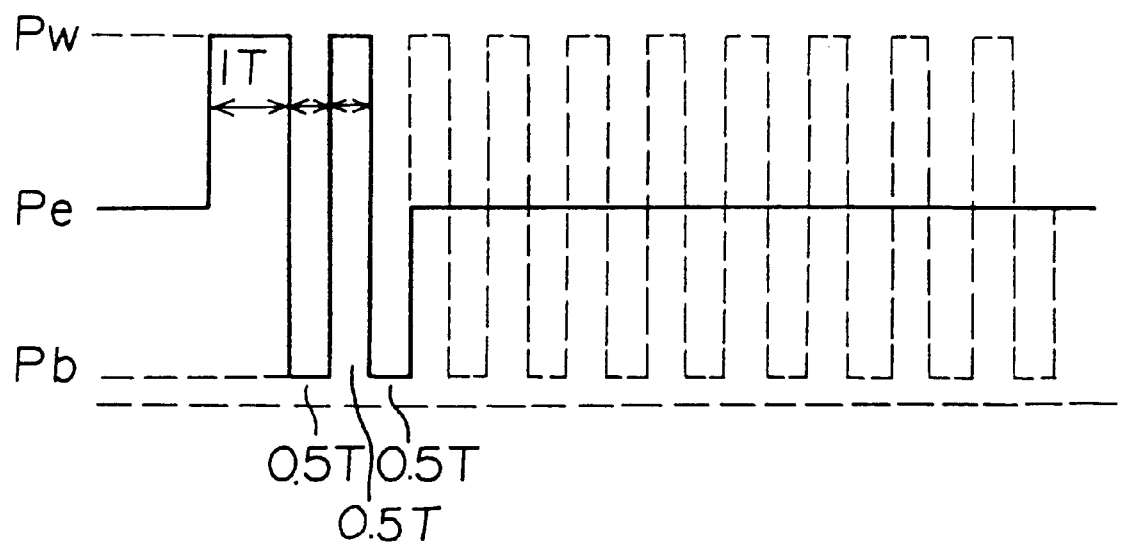

For recording, the pulse strategy as shown in FIG. 11 was employed.

Writing power Pw, erasing power Pe and bias power Pb were 12 mW, 6 mW and 0.8 mW, respectively. Retrieving power was usually the same as the bias power.

In the vicinity of these powers, the best jitter was obtained.

The optical head for recording was at a wavelength of 780 nm and NA=0.55, and the linear velocity during recording was the double speed (2.4 m/s) of the CD linear velocity.

Measurement of push-pull signal after recording PPa was carried out with respect to the signal passed through a low pass filter with a cut off frequency of 5 kHz.

The number of times for overwriting durability is the number of times within which a jitter of 3 T mark is maintained at a level of not higher than 17.5 nsec which is the upper limit stipulated by the CD standards, when repetitive overwriting is carried out at the double speed.

Further, in the Tables, the radial contrast values RCb and RCa after recording are also indicated. If the groove depth exceeds 45 nm, RCa tends to exceed 0.6 such being undesirable.

Further, if the groove depth exceeds 50 rm, the push-pull PPa after recording tends to exceed 0.1, such being undesirable.

Furthermore, the reflectance in the groove decreased to a level of 15% or lower, whereby the tracking servo was unstable. The groove width should be within a range of from 0.4 to 0.6 μm. Otherwise, repetitive overwriting for 1,000 times can not be accomplished.

If the groove depth is less than 25 nm, the radial contrast ratio between before and after recording becomes substantially lower than 0.3, and the number of times of overwriting will be less than from 500 to 600 times, such being undesirable.

EXAMPLE 2 AND COMPARATIVE EXAMPLE 2

In Example 2 and Comparative Example 2, disks were prepared so that the respective lower protective layers have different thicknesses of 80 nm (Example 2) and 260 nm (Comparative Example 2) which are in the vicinity of the minimum points (75 nm and 250 nm) of reflectance. Each disk was prepared in the same sputtering apparatus. The film density of each protective layer was about 93% of the bulk density.

In each disk, the thickness of the recording layer of $Ag_5In_6Sb_{59}Te_{30}$ was 20 nm, the thickness of the upper protective layer was 23 nm, and the thickness of the reflective layer was 100 nm.

Optically equal properties are obtainable.

Figure 15:
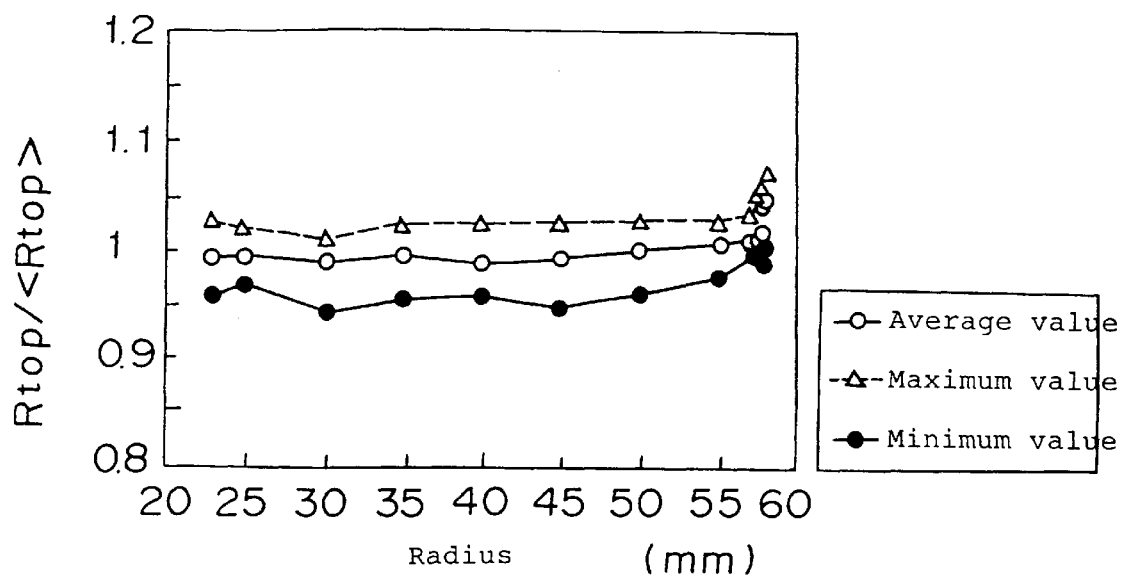
FIG. 15 is an explanatory view for the distribution of reflectance of disks in Examples of the present invention.
Figure 16:
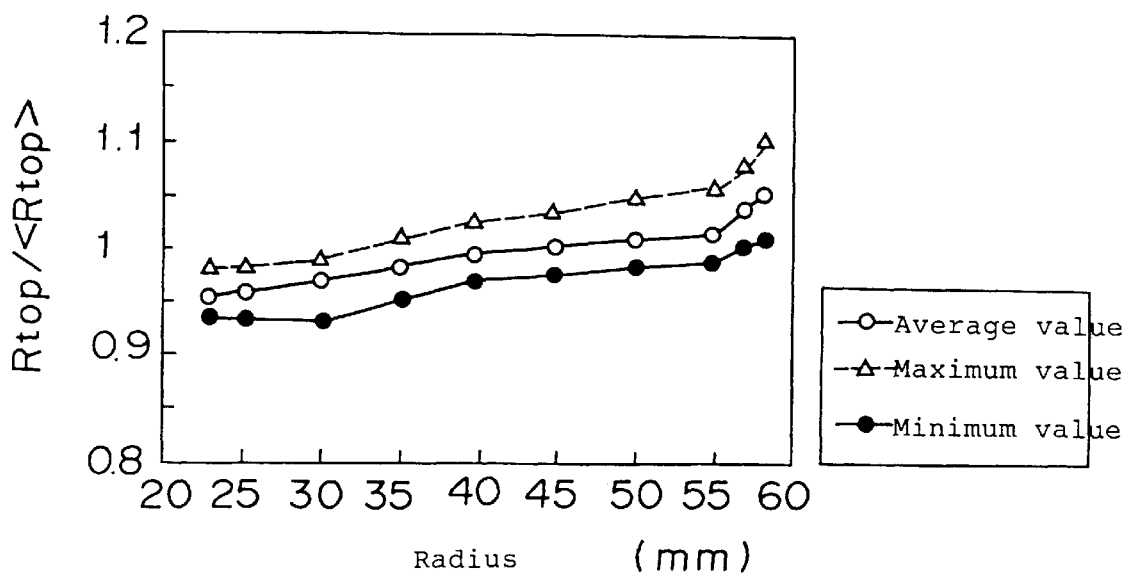
FIG. 16 is an explanatory view for the distribution of reflectance of disks in Comparative Examples.

Here, FIGS. 15 and 16 show the distribution in a radial direction of the reflectance of the disks of Example 2 and Comparative Example 2, respectively.

As is apparent from these Figures, results were obtained which show that the distribution of reflectance in the disk plane in Comparative Example 2 was evidently larger.

In each Figure, the center bent line shows average values at the respective radii, and the upper and lower bent lines show the maximum and minimum values at the respective radii.

To make the variation rate readily understandable, average values at all measured points are represented and standardized by $<R_{top}>$.

Including the distribution in circumferential direction, in Comparative Example 2, the variation was within a range of the average value+11% and the average value−7%. On the other hand, in Example 2, the variation was within the average value±6%.

In these experiments, there was a film thickness distribution of the average value ± about 2.5 to 3% in the sputtering apparatus, and therefore, the results include a distribution of± about 2.5 nm to 8 nm, respectively.

This is a distribution of an excellent level attainable by the current stationary opposing type sputtering apparatus.

On the other hand, in either film thickness, the reflectance changes in the same proportion to the same film thickness change Ad, whereby in Comparative Example 2 where the distribution is as much as± about 8 nm, the distribution of reflectance becomes accordingly large.

The distribution of reflectance in the same disk plane is desired to be within a range of ±10 to 12% for an optical disk. From this viewpoint and from the fact that the film deposition time and the cost for materials can be reduced to about ⅓, it is evidently preferred also from the viewpoint of the productivity to employ the thickness of the lower protective layer in the vicinity of the first minimum point of reflectance.

EXAMPLE 3

The composition of a lower protective layer of $ZnS:SiO_2$ and the dependency on the film thickness were studied by using a substrate of Example 1 (b) and a multilayer structure being such that a recording layer of $Ag_5In_5Sb_{59}Te_{31}$ was 20 nm, an upper protective layer of $(ZnS)_{80}(SiO_2)_{20}$ was 23 nm and a reflective layer of $Al_{98}Ta_2$ was 100 nm.

The groove depth was 35 nm, and the groove width was 0.53 μm.

The refractive index $n_{zs}$ of the ZnS:SiO$_2$ mixture film was determined in proportion to the molar ratio of ZnS (refractive index $n_z$=2.3) and SiO$_2$ (refractive index $n_s$=1.45). Namely, with a composition of $(ZnS)_{1-a}(SiO_2)_a$, $$n_{zs}=n_z \cdot (1-a)+n_s \cdot a \qquad (7)$$

Figure 17:
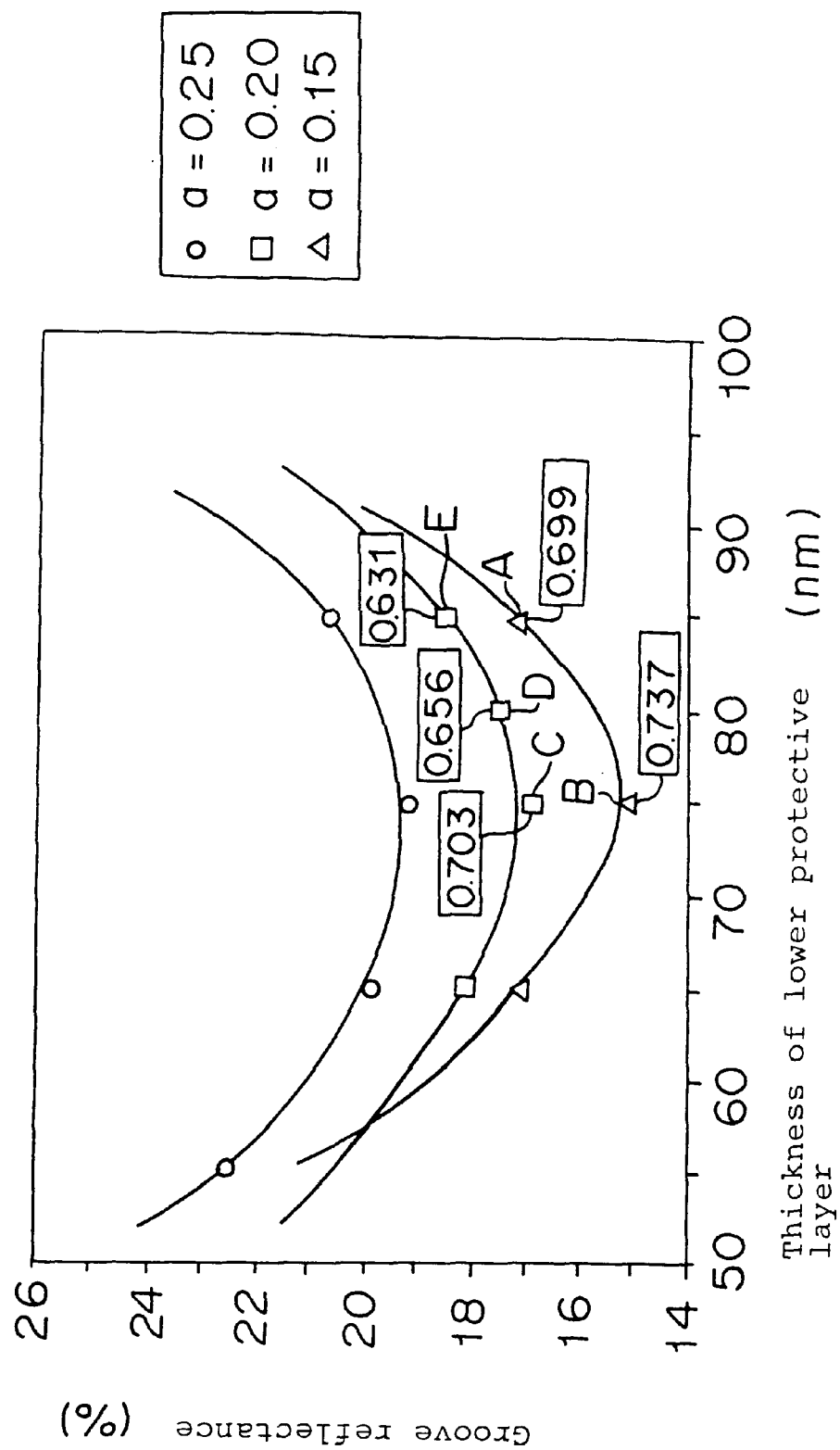
FIG. 17 is a view illustrating the dependency of the reflectance and the modulation on the thickness of the lower protective layer.

FIG. 17 shows the reflectance in the vicinity of the first minimum point of reflectance and the dependency of the modulation on the thickness of the lower protective layer, in the cases of a=0.15, 0.20 and 0.25.

The modulation were 0.699, 0.737, 0.703, 0.656 and 0.631 at points A, B, C, D and E in the Figure, respectively.

When the molar concentration of SiO$_2$ becomes as large as 0.25, the refractive index deceases, whereby the reflectance at the minimum point increases.

In such a case, a range in which the film thickness can be increased without substantially decreasing the modulation, tends to be narrow, the extent for increase at a level of 5 nm at least. On the other hand, if the refractive index is increased by reducing SiO$_2$ to a=0.15, it is rather necessary to depart from the minimum point in order to maintain the in-groove reflectance of 15%.

There will be a room to increase the film thickness by from 10 to 20 nm, whereby it is possible to improve the overwriting durability while maintaining the reflectance and the modulation at the same levels.

As shown in FIG. 9, in this film thickness region, it is advantageous for the durability to increase the film thickness even by 5 nm.

Figure 18:
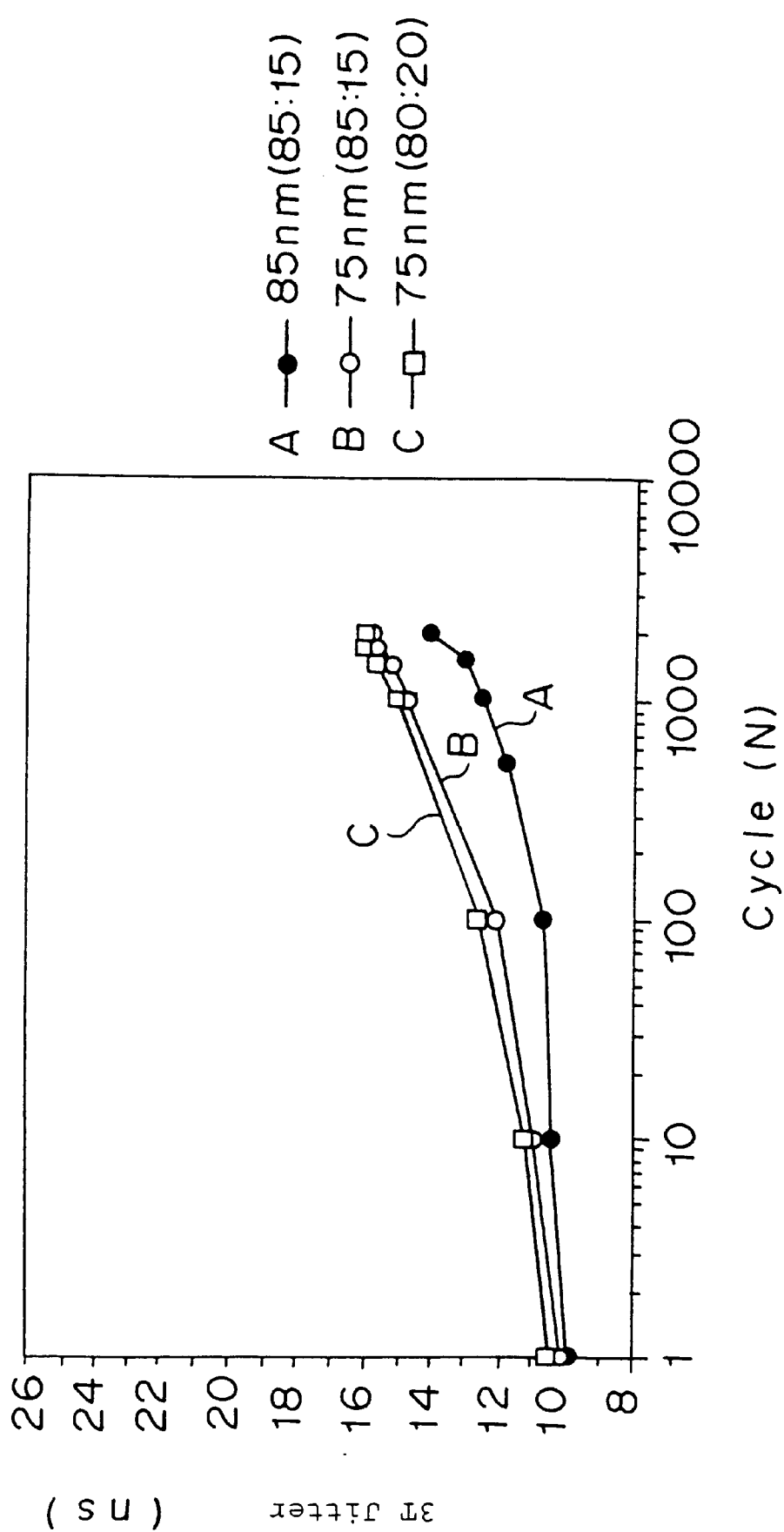
FIG. 18 is a view illustrating the overwriting durability against the thickness of the lower protective layer.

FIG. 18 shows the results of evaluation in which repetitive overwriting durability with the lower protective layer shown at A, B or C in FIG. 17 was evaluated in the same manner as in FIG. 11.

It is evident that the lower protective layer shown by C in the Figure is a good example of the present invention, wherein the optical proprieties and the repetitive overwriting durability are well balanced.

However, the durability of the protective layer itself is best at a=0.20, and a being less than 0.1 is not desirable.

Further, if a is larger than 0.3, there will be a problem in the stability with time, such being undesirable.

The same composition may be used for the upper and lower protective layers, or a some compositional difference (difference in the refractive index) may be made, for example by setting $0.13 \leq a \leq 0.17$ for the lower protective layer and $0.18 \leq a \leq 0.22$ for the upper protective layer. Such a choice is suitably determined depending upon the optical requirements.

EXAMPLE 4

By using the substrate and the multilayer structure of Example 1 (b), a disk was prepared in the same manner except that the recording layer was changed to an alloy layer of $Zn_3Ge_8Sb_{61}Te_{28}$. The disk was initialized by a bulk eraser and then subjected to overwriting at the double speed of CD in accordance with the recording pulse strategy shown in FIG. 11.

When Pw=13 mW, Pe=6.5 mW and Pb=0.8 mW, the jitter was less than 10% of clock period T=115 nsec, the modulation degree was 0.70, the reflectance was 18.1%, PPa=0.076, RCb=0.16, and RCa=0.51 (RCb/RCa=0.31). The repetitive overwriting durability was at least 2,000 times.

EXAMPLE 5

On the substrate of Example 1 (b), 80 nm of a $(ZnS)_{80}(SiO_2)_{20}$ layer, 20 nm of an $Ag_6Ge_5Sb_{70}Te_{19}$ layer as a recording layer, 20 nm of a $(ZnS)_{80}(SiO_2)_{20}$ layer and 200 nm of an $Al_{97.5}Ta_{2.5}$ alloy layer were sequentially deposited by magnetron sputtering, and 4 μm of an ultraviolet-curable resin layer was further formed thereon to obtain an optical disk.

This optical disk was subjected to melt initial crystallization by means of another optical disk initializing apparatus using an elliptic beam with a wavelength of 810 nm and with a long axis of 50 μm and a short axis of about 2 μm, at a linear velocity of 4.5 m/s, a beam radial transferring speed of 5 μm/rotation with a laser power of 250 mW, whereby initial crystallization was possible.

Using an optical disk evaluation apparatus (laser wavelength: 780 nm, NA: 0.55), recording of EFM random signal (clock frequency: 115 nsec) was carried out at a linear velocity of 2.8 m/s.

During the recording, Pw=13 mW, Pe=6.5 mW and Pb=0.8 mW in accordance with the recording pulse strategy as shown in FIG. 11.

The jitter value showing the actual signal characteristic was less than 10% of the clock period for the shortest mark length, and thus a good characteristic was obtained. Further, this characteristic was maintained even after repetitive overwriting for 1,000 times.

Further, the recorded signal was left to stand for 1,000 hours in an environment at a temperature of 80° C. under a relative humidity of 80%, whereby no deterioration was observed in the recorded signal.

EXAMPLE 6

On the substrate of Example 1 (b), 80 nm of a $(ZnS)_{80}(SiO_2)_{20}$ layer, 20 nm of a $Ge_7Sb_{60}Te_{27}Zn_6$ layer as a recording layer, 20 nm of a $(ZnS)_{80}(SiO_2)_{20}$ layer and 200 nm of an $Al_{97.5}Ta_{2.5}$ alloy layer, were sequentially deposited by magnetron sputtering, and 4 μm of an ultraviolet-curable resin layer was further formed thereon to obtain an optical disk.

This optical disk was subjected to melt initial crystallization by means of another optical disk initializing apparatus using an elliptic beam with a wavelength of 810 nm and with a long axis of 50 μm and a short axis of about 2 μm, at a linear velocity of 4.5 m/s, a beam radial transferring speed of 5 μm/rotation with a laser power of 250 mW, whereby initial crystallization was possible.

During the recording, Pw=13 mW, Pe=6.5 mW and Pb=0.8 mW in accordance with the recording pulse strategy as shown in FIG. 11.

The jitter value showing the actual signal characteristic was less than 10% of the clock period for the shortest mark length, and thus a good characteristic was obtained. Further, this characteristic was maintained even after repetitive overwriting for 1,000 times.

Further, the recorded signal was left to stand for 1,000 hours in an environment at a temperature of 80° C. under a relative humidity of 80%, whereby no deterioration was observed in the recorded signal.

EXAMPLE 7

On the substrate of Example 1 (b), 80 nm of a $(ZnS)_{80}(SiO_2)_{20}$ layer, 1 nm of a $Sb_2Te_3$ layer as a crystallization accelerating layer, 1 nm of a Sb layer as a composition-adjusting layer, 18 nm of a $Ge_{10}Sb_{67}Te_{23}$ layer as a recording layer, 20 nm of a $(ZnS)_{80}(SiO_2)_{20}$ layer and 100 nm of an $Al_{97.5}Ta_{2.5}$ alloy layer, were sequentially deposited by magnetron sputtering, and 4 μm of an ultraviolet-curable resin layer was further formed thereon to obtain an optical disk.

This disk was subjected to melt initial crystallization by means of another optical disk initializing apparatus using an elliptic beam with a wavelength of 810 nm and with a long axis of 50 μm, at a disk rotational speed of 2,700 rpm at a beam radial transferring speed of 5 μm/rotation, with a laser power of 400 mW, with a radius of 64 mm and a laser power of 170 mW with a radius of 27 mm, whereby initial crystallization was possible.

During the recording, Pw=13 mW, Pe=6.5 mW and Pb=0.8 mW in accordance with the recording pulse strategy as shown in FIG. 11.

The jitter value showing the actual signal characteristic was less than 10% of the clock period for the shortest mark length, and thus a good characteristic was obtained. This characteristic was maintained even after repetitive overwriting for 1,000 times.

Further, the recorded signal was left to stand for 2,000 hours in an environment at a temperature of 80° C. under a relative humidity of 80%, whereby no deterioration was observed in the recorded signal.

EXAMPLE 8

On the substrate of Example 1 (b), a first lower protective layer, a second lower protective layer, a recording layer, an upper protective layer and a reflective layer were formed to obtain a recording medium having a 5-layer structure.

The thicknesses of the respective layers were such that the first lower protective layer was 25 nm, the second lower protective layer was 65 nm, the recording layer was 20 nm, the upper protective layer was 22.5 nm, and the reflective layer was 200 nm.

Using a composite sintered target obtained by hot pressing a powder mixture having a composition of $ZnS:SiO_2:MgF_2=19:10:71$ (mol %), high frequency sputtering (13.56 MHz) was carried out under an Ar gas pressure of 0.7 Pa to form the first lower protective layer in contact with the substrate.

The film density was 3.4 g/cc, which was substantially 100% of the theoretical density. The refractive index n of this film was 1.50.

For the second lower protective layer and the upper protective layer which are in contact with the recording layer, $(ZnS)_{80}(SiO_2)_{20}$ was used, and film forming was carried out by a high frequency (13.56 MHz) sputtering.

The film density was 3.5 g/cm$^3$, which was 94% of the theoretical density. The refractive index of this film was 2.07.

The composition of the recording layer was $Ag_5In_6Sb_{59}Te_{30}$, and for the reflective layer, an $Al_{98}Ta_2$ alloy was used. The recording layer and the reflective layer were formed by direct current sputtering under an Ar gas pressure of 0.7 Pa. Further, an ultraviolet curable resin having a thickness of about 5 μm was formed thereon.

This disk was subjected to initialization i.e. crystallization treatment of the recording layer in the same manner as in Example 1, and then repetitive overwriting of EFM random pattern was carried out while rotating the disk at a linear velocity of 2.4 m/s and with Pw=14 mW, Pe=7.0 mW and Pb=0.8 mW in accordance with the recording pulse strategy as shown in FIG. 11.

With this multilayer structure, the first lower protective layer was optically the same as the substrate and thus negligible.

As assumed from the calculation example of FIG. 8, the thickness of the second lower protective layer is slightly thinner than the thickness at the minimum value of reflectance, and the phase difference δ was advantageous for groove recording. The modulation was at least 0.75 with Pw of at least 11 mW.

It was confirmed that as compared with a case where the thickness is 80 nm which is a slightly thicker than the film thickness of 75 nm at the minimum value of reflectance in FIG. 8, a larger modulation can advantageously be obtained even at the same reflectance.

Further, 3 T jitter of the initial recording was 10 nsec, and the jitter after repetitive overwriting for 1,000 times was 15 nsec. Thus, the standard for the upper limit of jitter of 17.5 nsec was satisfied for retrieving at the double speed of CD.

COMPARATIVE EXAMPLE 3

On the substrate of Example 1 (b), a lower protective layer, a recording layer, an upper protective layer and a reflective layer were formed to obtain recording medium having a quadri-layer structure.

The thicknesses of the respective layers were such that the lower dielectric layer was 65 nm, the recording layer was 20 nm, the upper dielectric layer was 22.5 nm, and the reflective layer was 200 nm. For the lower protective layer and the upper protective layer, $(ZnS)_{80}(SiO_2)_{20}$ was formed into a film by high frequency (13.56 MHz) sputtering. The composition of the recording layer was $Ag_5In_6Sb_{59}Te_{30}$, and for the reflective layer, an $Al_{98}Ta_2$ alloy was used. The recording layer and the reflective layer were deposited by direct sputtering under an Ar gas pressure of 0.7 Pa. Further, an ultraviolet curable resin having a thickness of about 5 μm was formed thereon.

This disk was subjected to initialization i.e. crystallization treatment of the recording layer, in the same manner as in Example 1, and then, while rotating the disk at a linear velocity of 2.4 m/s, repetitive overwriting of EFM random pattern was carried out with Pw=14 mW, Pe=7.0 mW and Pb=0.8 mW in accordance with the recording pulse strategy (clock period T=115 nsec) as shown in FIG. 11.

Optically, this is the same as Example 8, and a large modulation of at least 0.75 was obtained. However, while 3 T jitter in the initial recording was good at 11 nsec, the increase of jitter after repetitive overwriting for 1,000 times was 10 nsec, and the standard for a jitter of at most 17.5 nsec in retrieving at the double speed of cd, was satisfied only up to 500 times.

TABLE 1

| Examples | Groove depth (nm) | Groove width (nm) | Overwriting durability (times) | Reflectance (%) | Modulation degree | PPa | RCb | RCa | RCb/RCa |
|---|---|---|---|---|---|---|---|---|---|
| 1(a) | 31.1 | 0.58 | 1100 | 18.1 | 0.72 | 0.072 | 0.17 | 0.52 | 0.33 |
| 1(b) | 31.5 | 0.53 | 1400 | 18.3 | 0.71 | 0.070 | 0.17 | 0.53 | 0.32 |

TABLE 1-continued

| Examples | Groove depth (nm) | Groove width (nm) | Overwriting durability (times) | Reflectance (%) | Modulation degree | PPa | RCb | RCa | RCb/RCa |
|---|---|---|---|---|---|---|---|---|---|
| 1(c) | 31.8 | .047 | 1200 | 17.9 | 0.70 | 0.062 | 0.16 | 0.51 | 0.31 |
| 1(d) | 36.3 | 0.56 | 1600 | 17.8 | 0.70 | 0.081 | 0.18 | 0.55 | 0.33 |
| 1(e) | 35.7 | 0.50 | 1400 | 17.5 | 0.69 | 0.073 | 0.17 | 0.54 | 0.31 |
| 1(f) | 34.9 | 0.45 | 1200 | 17.1 | 0.89 | 0.067 | 0.16 | 0.52 | 0.31 |
| 1(g) | 41.0 | 0.58 | 1500 | 16.5 | 0.68 | 0.085 | 0.20 | 0.58 | 0.34 |
| 1(h) | 41.8 | 0.55 | 1600 | 16.2 | 0.71 | 0.081 | 0.19 | 0.58 | 0.33 |
| 1(i) | 40.5 | 0.44 | 1700 | 16.1 | 0.69 | 0.073 | 0.18 | 0.56 | 0.32 |

TABLE 2

| Comparative Examples | Groove depth (nm) | Groove width (nm) | Overwriting durability (times) | Reflectance (%) | Modulation degree | PPa | RCb | RCa | RCb/RCa |
|---|---|---|---|---|---|---|---|---|---|
| 1(a) | 30.3 | 0.63 | 800 | 17.8 | 0.72 | 0.073 | 0.15 | 0.54 | 0.28 |
| 1(b) | 31.6 | 0.38 | 900 | 18.1 | 0.68 | 0.058 | 0.16 | 0.51 | 0.31 |
| 1(c) | 46.0 | 0.55 | 1700 | 15.5 | 0.72 | 0.082 | 0.25 | 0.62 | 0.40 |
| 1(d) | 58.0 | 0.42 | 3000 | 14.9 | 0.68 | 0.115 | 0.32 | 0.75 | 0.43 |
| 1(e) | 57.8 | 0.55 | 2700 | 14.5 | 0.70 | 0.120 | 0.33 | 0.77 | 0.43 |
| 1(f) | 58.1 | 0.68 | 700 | 15.1 | 0.68 | 0.113 | 0.33 | 0.80 | 0.41 |
| 1(g) | 34.6 | 0.65 | 600 | 17.1 | 0.73 | 0.090 | 0.19 | 0.59 | 0.31 |
| 1(h) | 36.1 | 0.61 | 900 | 16.7 | 0.72 | 0.086 | 0.20 | 0.60 | 0.30 |
| 1(i) | 41.4 | 0.64 | 700 | 16.1 | 0.71 | 0.086 | 0.22 | 0.59 | 0.37 |

According to the present invention, a phase-change medium can be presented which provides groove signals compatible with the CD format although the reflectance is low, and which provides a high contrast and undergoes little deterioration by rewriting of data in many times.

We claim:

1. An optical information recording medium comprising a substrate provided with periodically wobbling guide grooves with a track pitch of 1.6±0.1 μm, and a lower protective layer, a phase-change type recording layer, an upper protective layer and a reflective layer formed in this sequence on the substrate, for recording, retrieving and erasing amorphous marks in the guide grooves by modulation of light intensity of at least two levels by means of a focused light having a wavelength of 780±30 nm applied from the side of the substrate opposite to the recording layer side so that a crystalline state with a reflectance of from 15 to 25% is an unrecorded state, and an amorphous state with a reflectance of less than 10% is a recorded state, wherein the recording layer is a thin film of an alloy of $My_y(Sb_xTe_{1-x})_{1-y}$ where $0 \leq y < 0.3$, $0.5 < x < 0.9$, and My is at least one member selected from the group consisting of In, Ga, Zn, Ge, Sn, Si, Cu, Au, Ag, Pd, Pt, V, Nb, Ta, Pb, Cr, Co, O, S and Se, and its thickness is from 15 to 30 nm, the thickness of the lower protective layer is at least 70 nm and less than 150 nm and thicker by more than 0 nm and not more than 30 nm than the thickness where the reflectance in the crystalline state becomes minimum, and the grooves have a depth of from 25 to 45 nm and a width of from 0.4 to 0.6 μm.

2. The optical information recording medium according to claim 1, wherein the protective layers are made of $(ZnS)_{1-a}(SiO_2)_a$, where $0.13 \leq a \leq 0.17$ for the lower protective layer, and $0.18 \leq a \leq 0.22$ for the upper protective layer.

3. The optical information recording medium according to claim 1, wherein the guide grooves have a depth of from 30 to 40 nm and a width of from 0.45 to 0.55 μm.

4. The optical information recording medium according to claim 1, wherein the lower protective layer has a refractive index of from 2.0 to 2.2 and a thickness of from 70 to 90 nm, the thickness of the upper protective layer is from 10 to 30 nm, and the reflective layer is $Al_{1-b}M_b$, where $0.005 \leq b \leq 0.1$, and M is Ta or Ti having a thickness of from 50 to 200 nm.

5. The optical information recording medium according to claim 1, wherein the phase-change type recording layer is made of $Ag_\gamma In_\delta Sb_\epsilon Te_\eta$, where $3 < \gamma < 10$, $3 < \delta < 8$, $55 < \epsilon 65$, $25 < \eta < 35$, $6 < \gamma + \delta < 13$, and $\gamma + \delta + \epsilon + \eta = 100$.

6. The optical information recording medium according to claim 1, wherein the phase-change type recording layer has a composition of $Mw_w Ge_z(Sb_x Te_{1-x})_{1-z-w}$, where Mw is at least one member of Ag and zn, $0.60 \leq x \leq 0.85$, $0.01 \leq z \leq 0.20$, $0.01 \leq w \leq 0.15$, and $0.02 \leq z+w < 0.30$.

7. The optical information recording medium according to claim 1, wherein to carry out an initialization operation by irradiating with an energy beam for crystallization, after forming the phase-change type recording layer, the recording layer is locally melted and crystallized during resolidification.

8. The optical information recording medium according to claim 1, which is an optical information recording medium whereby mark length modulation recording and erasing are carried out by modulating a laser power among at least 3 power levels at a linear velocity of from 1 to 7 m/s, wherein to form inter-mark portions, erasing power Pe capable of recrystallizing amorphous mark portions is applied, and to form mark portions having a length nT where T is a clock period and n is an integer of at least 2, writing power Pw and bias power Pb are applied in such a manner that when the time for applying writing power Pw is represented by $\alpha_1 T, \alpha_2 T, \ldots, \alpha_m T$, and the time for applying bias power Pb is represented by $\beta_1 T, \beta_2 T, \ldots, \beta\beta_m T$, the laser application period is divided into m pulses in a sequence of $\alpha_1 T, \beta_1 T, \alpha_2 T, \beta_2 T, \ldots, \alpha_m T, \beta_m T$, to satisfy the following formulae:

when $2 \leq i \leq m-1$, $\alpha_i \leq \beta_i$;

m=n−k, where k is an integer of 0≦k≦2, provided that $n_{min}$−k≧1, where $n_{min}$ is the minimum value of n; and $\alpha_1+\beta_1+\ldots+\alpha_m+\beta_m$=n−j, where j is a real number of 0≦j≦2;

and under such conditions that Pw>Pe, and 0<Pb≦0.5 Pe, provided that when i=m, 0<Pb≦Pe.

9. The optical information recording medium according to claim 8, wherein 0<Pb≦0.2 Pe, provided that when i is m, 0<Pb≦Pe, and when 2≦i≦m−1, $\alpha_i+\beta_i$=1.0, and 0.05<$\alpha_i$≦0.5.

10. An optical information recording medium comprising a substrate provided with periodically wobbling guide grooves with a track pitch of 1.6±0.1 μm, and a first lower protective layer, a second lower protective layer, a phase-change type recording layer, an upper protective layer and a reflective layer formed in this sequence on the substrate, for recording, retrieving and erasing amorphous marks in the guide grooves by modulation of light intensity of at least two levels by means of a focused light having a wavelength of 780±30 nm applied from the side of the substrate opposite to the recording layer side so that a crystalline state with a reflectance of from 15 to 25% is an unrecorded state, and an amorphous state with a reflectance of less than 10% is a recorded state, wherein the recording layer is a thin film of an alloy of $My_y/(Sb_xTe_{1-x})_{1-y}$ where 0≦y<0.3, 0.5<x<0.9, and My is at least one member selected from the group consisting of In, Ga, Zn, Ge, Sn, Si, Cu. Au, Ag, Pd, Pt, V, Nb, Ta, Pb, Cr, Co, O, S and Se, and its thickness is from 15 to 30 nm, the difference between the refractive index of the first lower protective layer and the refractive index of the substrate is less than 0.1, the thickness of the second lower protective layer is thinner by more than 0 nm and not more than 30 nm than the minimum thickness where the reflectance in the crystalline state becomes minimum, the total thickness of the first and second lower protective layers is at least 70 nm and less than 150 nm, and the grooves have a depth of from 25 to 45 nm and a width of from 0.4 to 0.6 μm.

11. The optical information recording medium according to claim 10, wherein the grooves have a depth of from 30 to 40 nm and a width of from 0.45 to 0.55 μm.

12. The optical information recording medium according to claim 10, wherein the thickness of the upper protective layer is from 10 to 30 nm, and the reflective layer is $Al_{1-b}M_b$, where 0.005≦b≦0.1, and M is Ta or Ti, having a thickness of from 50 to 200 nm.

13. The optical information recording medium according to claim 10, wherein the phase-change type recording layer is made of $Ag_\gamma In_\delta Sb_\epsilon Te_\eta$, where 3<γ<10, 3<δ<8, 55<ε<65, 25<η<35, 6<γ+δ<13, and γ+δ+ε+η=100.

14. The optical information recording medium according to claim 10, wherein the phase-change type recording layer has a composition of $Mw_w Ge_z(Sb_x Te_{1-x})_{1-z-w}$, where Mw is at least one member of Ag and Zn, 0.60≦x≦0.85, 0.01≦z≦0.20, 0.01≦w≦0.15, and 0.02≦z+w<0.30.

15. The optical information recording medium according to claim 10, wherein to carry out an initialization operation by irradiating an energy beam for crystallization, after forming the phase-change type recording layer, the recording layer is locally melted and crystallized during resolidification.

16. The optical information recording medium according to claim 10, which is an optical information recording medium whereby mark length modulation recording and erasing are carried out by modulating a laser power among at least 3 power levels at a linear velocity of from 1 to 7 m/s, wherein to form inter-mark portions, erasing power Pe capable of recrystallizing amorphous mark portions is applied, and to form mark portions having a length nT where T is a clock period and n is an integer of at least 2, writing power Pw and bias power Pb are applied in such a manner that when the time for applying writing power Pw is represented by $\alpha_1T, \alpha_2T, \ldots, \alpha_mT$, and the time for applying bias power Pb is represented by $\beta_1T, \beta_2T, \ldots, \beta_mT$, the laser application period is divided into m pulses in a sequence of $\alpha_1T, \beta_1T, \alpha_2T, \beta_2T, \ldots, \alpha_mT, \beta_mT$, to satisfy the following formulae:

when 2≦i≦m−1, $\alpha_i$≦$\beta_i$;

m=n−k, where k is an integer of 0≦k≦2, provided that $n_{min}$−k>1, where $n_{min}$ is the minimum value of n; and $\alpha_1+\beta_1+\ldots+\alpha_m+\beta_m$=n−j, where j is a real number of 0≦j≦2;

and under such conditions that Pw>Pe, and 0<Pb≦0.5 Pe, provided that when i=m, 0<Pb≦Pe.

17. The optical information recording medium according to claim 16, wherein 0<Pb≦0.2 Pe, provided that when i is m, 0<Pb≦Pe, and when 2≦i≦m−1, $\alpha_i+\beta_i$=1.0, and 0.05<$\alpha_i$≦0.5.

18. The optical information recording medium according to claim 1, wherein a readily crystallizable crystallization accelerating layer is formed between the substrate and the recording layer in contact with the recording layer in a thickness of from 0.2 to 5 nm, and the recording layer is treated for initial crystallization by irradiation of light energy.

19. The optical information recording medium according to claim 18, wherein the crystallization accelerating layer has a composition close to $Sb_2Te_3$.

20. The optical information recording medium according to claim 18, wherein a composition-adjusting layer is formed adjacent to the crystallization accelerating layer, so that the composition averaging the compositions of the composition-adjusting layer and the crystallization accelerating layer is close to the composition of the recording layer.

21. An optical information recording medium comprising a substrate provided with periodically wobbling guide grooves with a track pitch of 1.6±0.1 μm, and a lower protective layer, a phase-change type recording layer, an upper protective layer and a reflective layer formed in this sequence on the substrate, for recording, retrieving and erasing amorphous marks in the guide grooves by modulation of light intensity of at least two levels by means of a focused light having a wavelength of 780±30 nm applied from the side of the substrate opposite to the recording layer side so that a crystalline state with a reflectance of from 15 to 25% is an unrecorded state, and an amorphous state with a reflectance of less than 10% is a recorded state, wherein the recording layer is a thin film of an alloy of $Ge(Sb_xTe_{1-x})_{1-y}$ where 0.60≦x≦0.85 and 0.01≦y≦0.20, and its thickness is from 15 to 30 nm, the thickness of the lower protective layer is at least 70 nm and less than 150 nm and thicker by more than 0 nm and not more than 30 nm than the thickness where the reflectance in the crystalline state becomes minimum, and the grooves have a depth of from 25 to 45 nm and a width of from 0.4 to 0.6 μm.

22. The optical information recording medium according to claim 21, wherein a readily crystallizable crystallization accelerating layer is formed between the substrate and the recording layer in contact with the recording layer in a thickness of from 0.2 to 5 nm, and the recording layer is treated for initial crystallization by irradiation of light energy.

23. The optical information recording medium according to claim 20, wherein the crystallization accelerating layer has a composition close to $Sb_2Te_3$.

24. The optical information recording medium according to claim 20, wherein a composition-adjusting layer is formed adjacent to the crystallization accelerating layer, so that the composition averaging the compositions of the composition-adjusting layer and the crystallization accelerating layer is close to the composition of the recording layer.

* * * * *

UNITED STATES PATENT AND TRADEMARK OFFICE
CERTIFICATE OF CORRECTION

| | | |
|---|---|---|
| PATENT NO. | : 6,115,352 | Page 1 of 1 |
| DATED | : September 5, 2000 | |
| INVENTOR(S) | : Takashi Ohno, et al. | |

It is certified that error appears in the above-identified patent and that said Letters Patent is hereby corrected as shown below:

Title page,
The CPA information has been omitted, also the Inventors' Residence are listed incorrectly. It should read as follows:

-- [45] **Date of Patent: *Sep. 5, 2000** --

-- [*]  Notice: This patent issued on a continued prosecution application filed under 37 CFR 1.53(d), and is subject to the twenty year patent term provisions of 35 U.S.C. 154(a)(2).

-- [75]  Inventors: Takashi Ohno; Masaaki Mizuno; Masae Kubo; Kanako Tsuboya; Michikazu Horie, all of Yokohama, Japan.

Signed and Sealed this

Twenty-eighth Day of August, 2001

Attest:

NICHOLAS P. GODICI
*Attesting Officer*   *Acting Director of the United States Patent and Trademark Office*